(12) United States Patent
Yoshizawa et al.

(10) Patent No.: US 6,636,797 B2
(45) Date of Patent: Oct. 21, 2003

(54) ENHANCED MULTIPLE INJECTION FOR AUTO-IGNITION IN INTERNAL COMBUSTION ENGINES

(75) Inventors: Koudai Yoshizawa, Kanagawa (JP); Atushi Teraji, Yokohama (JP); Hiroshi Miyakubo, Kanagawa (JP); Koji Hiraya, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 238 days.

(21) Appl. No.: 09/888,450

(22) Filed: Jun. 26, 2001

(65) Prior Publication Data

US 2001/0056322 A1 Dec. 27, 2001

(30) Foreign Application Priority Data

Jun. 26, 2000 (JP) ........................................ 2000-190692

(51) Int. Cl.[7] .............................................. F02M 45/02
(52) U.S. Cl. ...................................... 701/104; 123/299
(58) Field of Search ................................. 701/104, 102, 701/103, 105; 123/299, 295, 300, 478, 479, 480, 304

(56) References Cited

U.S. PATENT DOCUMENTS

| | | | | |
|---|---|---|---|---|
| 4,284,043 A | * | 8/1981 | Happel ........................ | 123/299 |
| 4,397,270 A | | 8/1983 | Aoyama ..................... | 123/90.16 |
| 4,576,129 A | * | 3/1986 | Wallenfang et al. ......... | 123/357 |
| 5,054,445 A | * | 10/1991 | Henkel et al. ............... | 123/300 |
| 5,265,574 A | | 11/1993 | Philipp et al. | |
| 5,535,716 A | | 7/1996 | Sato et al. ................... | 123/279 |
| 5,669,343 A | | 9/1997 | Adachi ...................... | 123/90.17 |
| 5,785,016 A | | 7/1998 | Enderle et al. ........... | 123/90.11 |
| 5,836,276 A | | 11/1998 | Iwasaki et al. ............ | 123/90.17 |
| 5,988,125 A | | 11/1999 | Hara et al. ................ | 123/90.16 |
| 2002/0000209 A1 | * | 1/2002 | Ando et al. ................... | 123/21 |

FOREIGN PATENT DOCUMENTS

| | | | |
|---|---|---|---|
| DE | 39 07 232 A1 | * 9/1990 | .......... F02M/45/04 |
| EP | 0 886 050 A2 | 12/1998 | |
| GB | 2 328 980 A | 3/1999 | |
| JP | 7-332141 | 12/1995 | |
| JP | 10-252512 | 9/1998 | |
| JP | 11-72038 | 3/1999 | |
| JP | 11-294125 | 10/1999 | |
| JP | 2000-73797 | 3/2000 | |
| WO | WO 99/06683 A1 | 2/1999 | |

OTHER PUBLICATIONS

U.S. patent application Ser. No. 09/767,025, Urushihara et al., filed Jan. 23, 2001.
U.S. patent application Ser. No. 09/769,365, Teraji et al., filed Jan. 26, 2001.
U.S. patent application Ser. No. 09/813,892, Hiraya et al., filed Mar. 22, 2001.
U.S. patent application Ser. No. 09/853,702, Yoshizawa et al., filed May 14, 2001.
M. Stockinger et al., "Versuche An Einem Gemischansaugenden Vergrennungsmotor Mit Selbstzuendung", MTZ Motortechnische Zeitschrift, vol. 53, No. 2, Feb. 1, 1992, pp. 80–85.
Ronald J. Pierik et al., "A Low–Friction Variable–Valve–Actuation Device, Part I: Mechanism Description and Friction Measurements", Society of Automotive Engineers, Inc., Paper 970338, General Motors Corporation, Research and Development Center, Aug. 1982.

* cited by examiner

*Primary Examiner*—Hieu T. Vo.
(74) *Attorney, Agent, or Firm*—Foley & Lardner

(57) ABSTRACT

An internal combustion engine has a fuel injection system capable of performing a multiple injection wherein a main injection event and a trigger injection event take place in this order in one cycle. With main injection, fuel is widely dispersed within a combustion chamber to create a main mixture for main combustion. With trigger injection, fuel is dispersed locally within the combustion chamber to create an ignitable mixture for auto-ignition. Auto-ignition of the ignitable mixture creates condition under which auto-ignition of the main mixture takes place. Fuel quantity and timing for each of main and trigger injections are varied corresponding to engine speed and load request to cause the main mixture to burn at a target crank angle after TDC of compression stroke.

18 Claims, 35 Drawing Sheets

ENHANCED MULTIPLE INJECTION FOR AUTO-IGNITION IN INTERNAL COMBUSTION ENGINES

BACKGROUND OF THE INVENTION

1. Field of the Invention

The present invention relates to an internal combustion engine capable of operating on auto-ignition combustion, and a system for and a method of controlling fuel delivery in a fuel injection system capable of performing a multiple injection wherein a main injection event and a trigger injection event take place in this order in one cycle.

2. Description of Related Art

When certain conditions are met within a charge of lean air/fuel mixture during low load operation, auto-ignition can occur wherein bulk combustion takes place initiated simultaneously from many ignition sites within the charge, resulting in very stable power output, very clean combustion and high thermal efficiency. NOx emission produced in controlled auto-ignition combustion is extremely low. In controlled auto-ignition combustion where the combustion is uniformly distributed throughout the charge from many ignition sites, the burnt gas temperature is substantially homogeneous with much lower local temperature values resulting in very low NOx emission.

Auto-ignition combustion at low speeds with low or middle load and spark-ignition combustion at high speeds with high or full load result in enhanced fuel consumption rate and reduced NOx emission at low speeds with low or middle load and high power output at high speeds with high or full load.

An auto-ignition, which is induced by heating fuel and significantly increasing the compression ratio, in four-stroke gasoline engine is described in U.S. Pat. No. 5,535,716, which claims priority of Japanese patent application No. 6-150487 that was laid open as JP-A 7-332141 on Dec. 22, 1995. Gasoline fuel is injected inside the intake port a considerable amount of time before the intake valve is open so that the mixture of air and gasoline in the intake port is sufficiently heated before entering the combustion chamber. The mixture is ignited by auto-ignition performed at high pressure. Since fuel sprayed within the intake port is completely evaporated before entering the combustion chamber, reliable auto-ignition is achieved. The compression ratio ranges from about 14 to about 20. Use of a compression ratio of 17.7 is described as the most preferred implementation. Injection is performed during a predetermined period from 10 degrees of crank angle before the intake valve is closed to 110 degrees of crank angle before the intake valve is opened.

In this known auto-ignition internal combustion engine, beginning of burning is governed by speed of cool oxidation reaction of gasoline under conditions when temperature and pressure rise due to compression by piston. Thus, it is within very narrow operation range that auto-ignition combustion is accomplished wherein beginning of burning occurs around TDC of compression stroke.

JP-A 11-72038 discloses a diesel engine having a fuel injection system capable of performing a split injection wherein fuel quantity for first injection is kept lower than or as low as 30% of total fuel quantity so that the remainder is set aside for second fuel injection at TDC of compression stroke.

According to this known technique, relatively large percent of the total fuel quantity is sprayed at around TDC of compression stroke. Sufficient mixing of air and fuel cannot be expected if total fuel quantity becomes great. Under this condition, burnt gas temperature is highly heterogeneous with very high local temperature values creating high NOx emission. Besides, beginning of burning is not controllably adjusted toward an appropriate crank angle around TDC of compression stroke against varying operating conditions, making it difficult to extend operation range where auto-ignition combustion can be accomplished. Thus, expected improvement in fuel consumption rate and emission performance cannot be made.

JP-A 10-252512 discloses an internal combustion engine having two fuel injectors, namely, a port fuel injector in communication with an intake port and a cylinder fuel injector in communication with a combustion chamber. At light load below a predetermined level, cylinder injection is suspended and total fuel quantity is sprayed into the intake port from the port fuel injector. Besides, intake and exhaust valves are adjusted to vary exhaust gas retaining duration to control cylinder temperature to provide conditions for auto-ignition. At load exceeding the predetermined level, the port fuel injector sprays fuel quantity corresponding to the predetermined level of load, and the cylinder fuel injector sprays insufficiency of total fuel quantity at around TDC of compression stroke.

According to this known technique, fuel quantity for injection by the cylinder fuel injector increases linearly as load request increases at high load exceeding the predetermined level. Sufficient mixing of air and fuel cannot be expected if total fuel quantity becomes great. Under this condition, burnt gas temperature is highly heterogeneous with very high local temperature values creating high NOx emission. Besides, beginning of burning is not controllably adjusted toward an appropriate crank angle around TDC of compression stroke against varying operating conditions, making it difficult to extend operation range where auto-ignition combustion can be accomplished. Thus, expected improvement in fuel consumption rate and emission performance cannot be made.

Several attempts are being made to enhance fuel injection capabilities to extend operating conditions at which auto-ignition combustion is accomplished. One such method is known as multiple or divided injection including split injection. Split injection consists of a first injection event separated from a second injection event by a delay.

SUMMARY OF THE INVENTION

It is an object of the present invention to provide a system and method for enhancing engine operation on auto-ignition combustion of fuel at extended operating conditions.

It is another object of the present invention to provide an internal combustion engine with a fuel injection system capable of performing enhanced fuel injection that enhances engine operation on auto-ignition combustion of fuel at extended operating conditions.

In accordance with one aspect of the present invention, there is provided an internal combustion engine comprising:

at least one cylinder for receiving a piston to define a combustion chamber;

an engine controller;

a fuel injection system having a fuel injector for delivering fuel to the combustion chamber; and a computer readable storage medium having information stored thereon representing instructions executable by the engine controller to enhance engine operation on auto-ignition combustion, wherein the engine controller is capable of controlling the fuel injection system to perform a multiple injection wherein a main injection event and a trigger injection event take place in this order in one cycle, and wherein the computer readable storage medium includes instructions for operating the engine controller to:

determine operating conditions; and determine fuel quantity and injection timing for at least one of main and trigger injections corresponding to the operating conditions to enable the multiple injection to govern beginning of burning (BOB).

BRIEF DESCRIPTION OF THE DRAWINGS

The present invention will be more fully appreciated as the same becomes better understood from the following detailed description when considered in connection with the accompanying drawings, in which like reference numerals and characters designate like or corresponding parts through the several views.

BEST MODES FOR CARRYING OUT THE INVENTION

Figure 1:
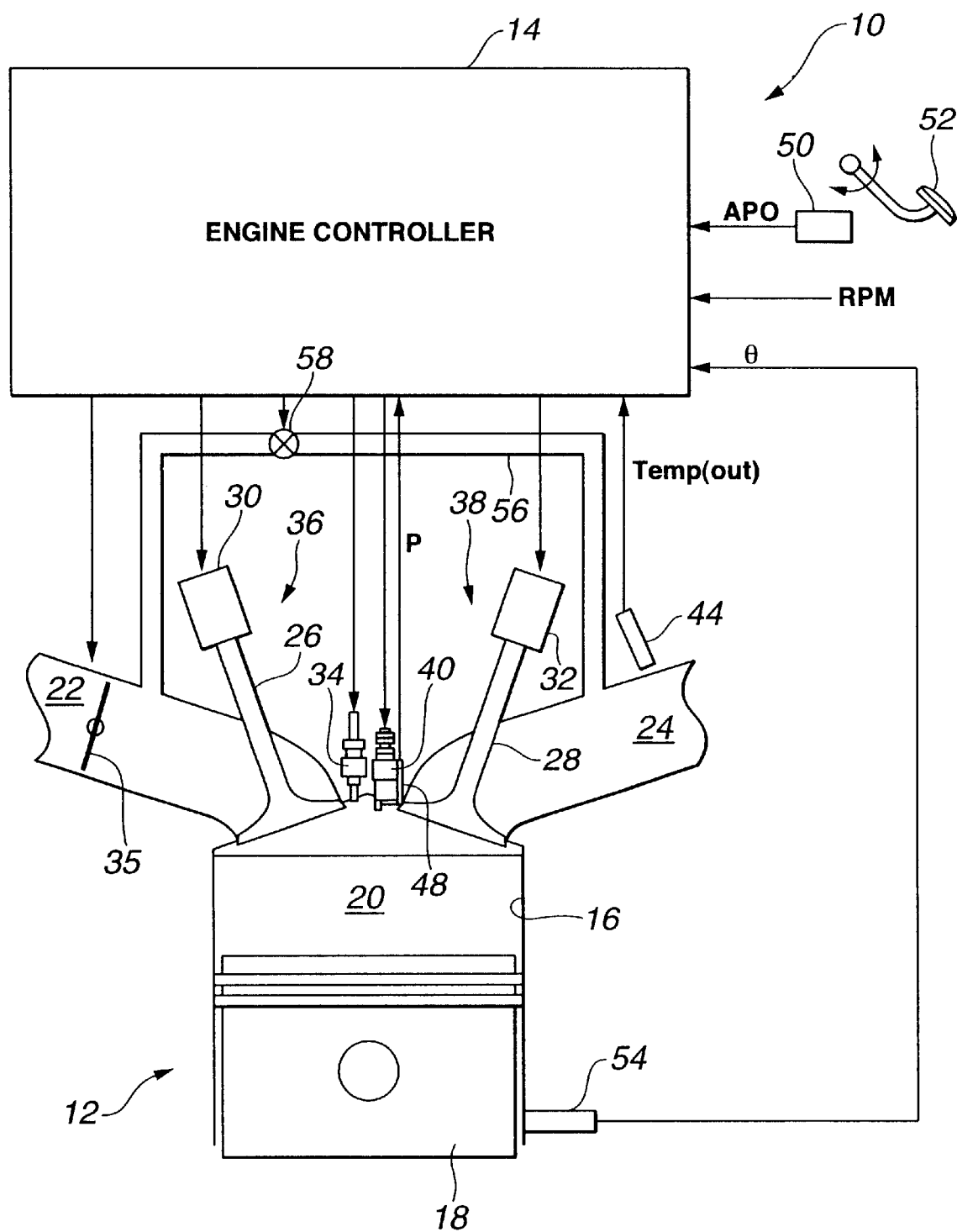
FIG. 1 is a block diagram illustrating a system and method for enhancing engine operation on auto-ignition combustion of fuel with low cetane number at extended operating conditions according to the present invention.

FIG. 1 provides a block diagram of a system or method for enhancing engine operation on auto-ignition combustion of fuel with low cetane number at extended operating conditions. In one embodiment, gasoline fuel is used. System 10 includes an internal combustion engine, indicated generally by reference numeral 12, in communication with an engine controller 14.

In FIG. 1, the area of a combustion chamber of engine 12 is shown. Engine 12 has at least one cylinder 16 with a piston 18 reciprocating therein to define a combustion chamber 20. Combustion chamber 20 is shown communicating with intake manifold 22 and exhaust manifold 24 via intake and exhaust valves 26 and 28, which, in one embodiment, are actuated by variable valve controllers 30 and 32. Fuel injector 34 of a fuel injection system is shown directly communicating with the combustion chamber 20 for direct delivery of fuel into combustion chamber 20 (cylinder direct injection). A throttle 35 is used to regulate intake air passing through intake manifold 22. A spark plug 40 provides a spark to initiate spark-ignition combustion.

An inlet control device 36 controls flow into combustion chamber 20. An outlet control device 38 controls flow from combustion chamber 20. In one embodiment, inlet control device 36 includes at least one intake valve 26 actuated by valve controller 30, and outlet control device 38 includes at least one exhaust valve 28 actuated by valve controller 32. However, as one skilled in the art would recognize, there are many alternative embodiments.

In one embodiment, a controlled amount of exhaust gas supplied from a EGR conduit 56 may be used to control cylinder temperature Temp. An EGR control valve 58 regulates flow of exhaust gas passing through EGR conduit 56.

In cases where engine 12 operates on spark-ignition combustion, particular control timing is transmitted to spark plug 40. In most cases where engine 12 operates on auto-ignition combustion, no such control timing is transmitted to spark plug 40. However, spark may be used to initiate auto-ignition.

Various sensors are provided to enhance engine operation on auto-ignition combustion at extended operating conditions. Various sensors may include a cylinder pressure sensor 48, which provides a signal indicative of cylinder pressure P. In one embodiment, an exhaust gas temperature sensor 44 is used to determine exhaust gas temperature Temp(out) in controlling cylinder temperature Temp. Exhaust gas temperature sensor 44 provides a signal indicative of temperature of exhaust gas resulting from combustion within combustion chamber 20.

Engine 12 may include various other sensors such as an engine speed sensor to provide a signal indicative of engine speed (RPM), a crank angle sensor 54 to provide a signal indicative of crank angle ($\theta$), a pedal position sensor 50 to provide a signal indicative of the opening angle (APO) of an accelerator pedal 52, and the like. Accelerator pedal 52 is used to determine the driver demand, which, in turn, is used, as a load request, in the calculation of fuel quantity for injection.

Figure 2:
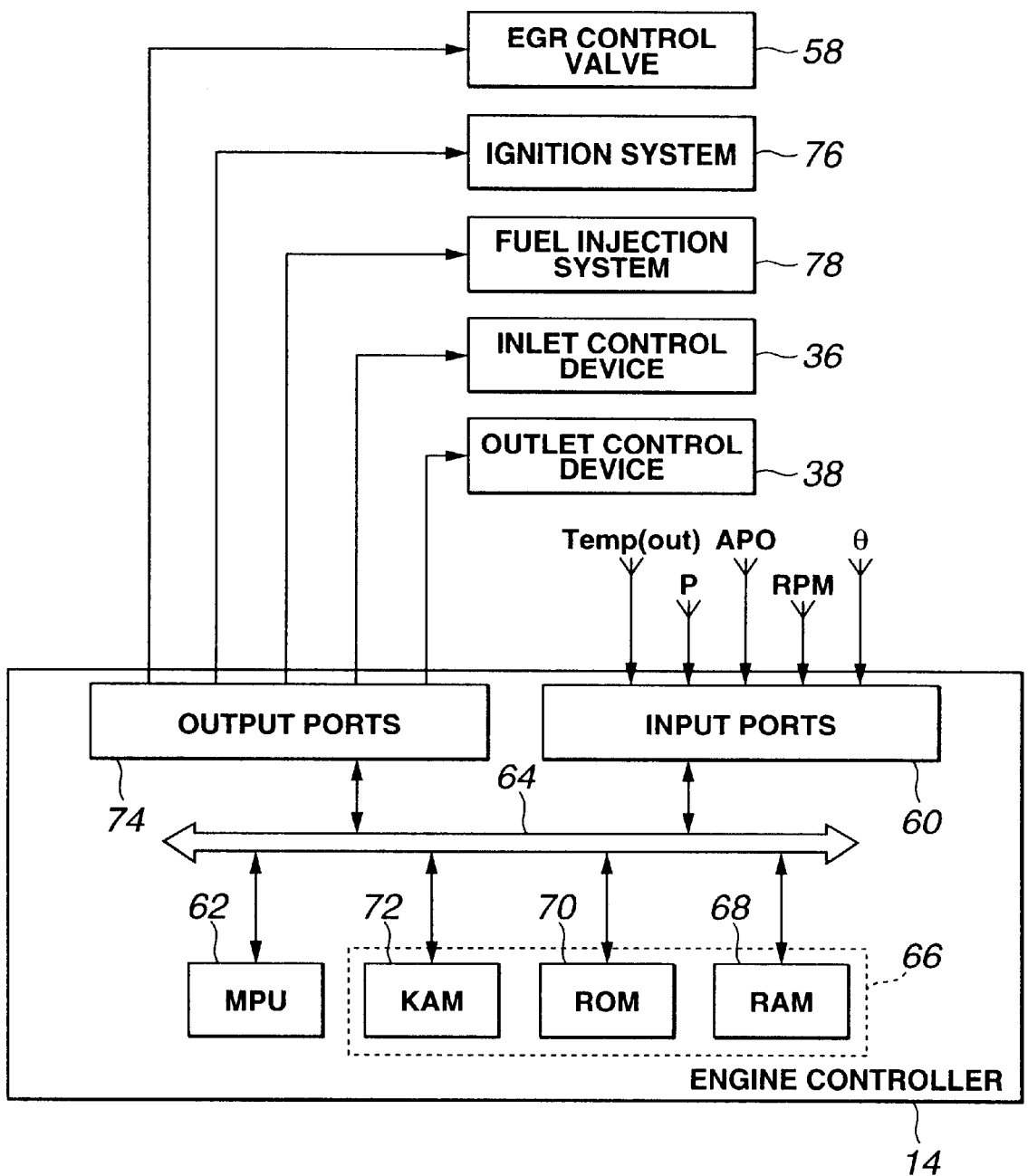
FIG. 2 is a block diagram illustrating engine controller according to the present invention.

Referring to FIG. 2, engine controller 14 receives signals from the various sensors via input ports 60, which may provide signal conditioning, conversion, and/or fault detection, as well known in the art. Input ports 60 communicate with processor 62 via a data/control bus 64. Processor 62 implements control logic in the form of hardware and/or software instructions, which may be stored in computer readable storage medium 66, to effect control of engine 12. Computer readable storage medium 66 may include various types of volatile or nonvolatile memory such as random-access memory (RAM) 68, read-only memory (ROM) 70, and keep-alive memory (KAM) 72. These "functional" classifications of memory may be implemented by one or more different physical devices such as PROMs, EPROMs, EEPROMs, flash memory, and the like, depending upon the particular application.

In one embodiment, processor 62 executes instructions stored in computer readable storage medium 66 to carry out the method for enhancing engine operation on auto-ignition combustion to communicate with various actuators of engine 12 via output ports 74. Actuators may control ignition timing or spark in an ignition system 76, injection timing and fuel quantity for injection by injectors 34 in a fuel injection system 78, valve timing of inlet control device 36, valve timing of outlet control device 38, and opening angle of EGR control valve 58.

Characteristic engine diagrams for auto-ignition combustion mode and spark-ignition combustion mode may be stored in controller 14 in the form of valve timings of inlet and outlet control devices 36 and 38.

Figure 30:
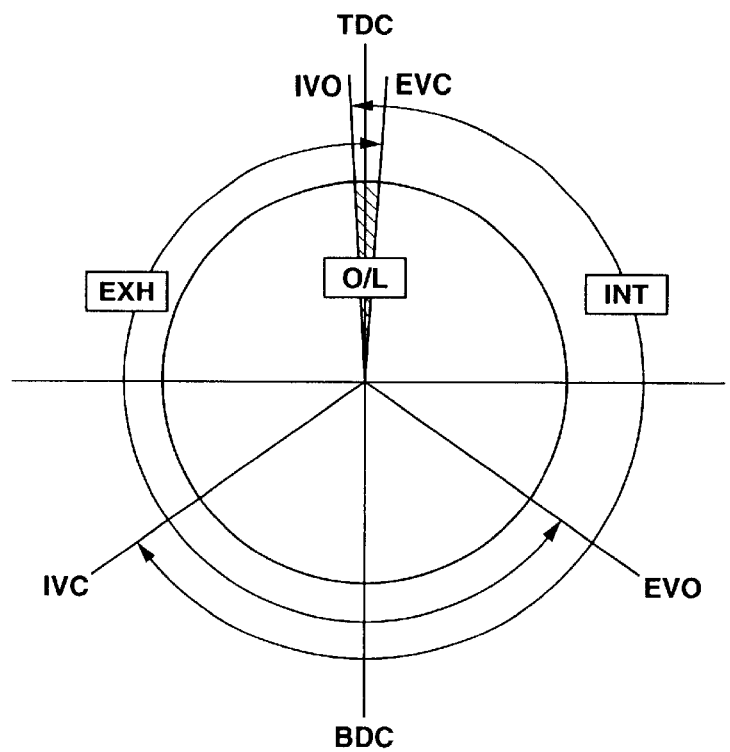
FIG. 30 is a valve timing diagram illustrating a representative example of valve timings of inlet and outlet control devices (intake and exhaust valves) for spark-ignition combustion mode.
Figure 31:
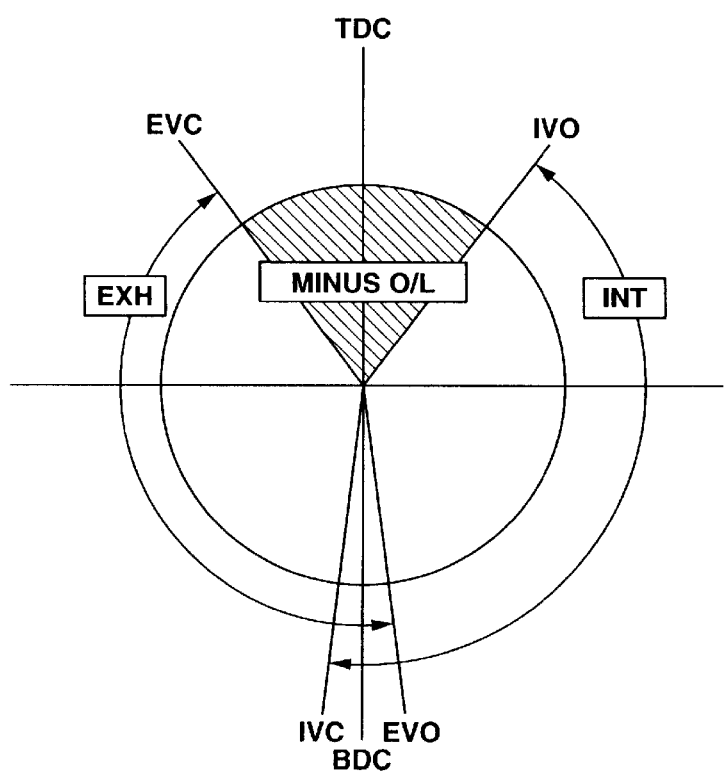
FIG. 31 provides a valve timing diagram illustrating valve timings of inlet and outlet control devices (intake and exhaust valves) for auto-ignition combustion mode.

With reference to FIGS. 30 and 31, such valve timings are described. FIG. 30 provides a diagram illustrating a representative example of valve timings of inlet and outlet control devices 36 and 38 (intake and exhaust valves 26 and 28) for spark-ignition combustion mode at full or near full load. In spark-ignition combustion mode, controller 14 transmits timings to outlet and inlet control devices 38 and 36 to provide optimum valve overlap duration around TDC of exhaust stroke of piston 18. FIG. 31 provides a diagram illustrating valve timings of inlet and outlet control devices 36 and 38 (intake and exhaust valves 26 and 28) for auto-ignition combustion mode. To provide optimum conditions for auto-ignition, exhaust valve 28 of outlet control device 38 is allowed to close before piston 18 reaches the TDC of the exhaust stroke, so that high temperature exhaust gas is retained and compressed in cylinder 16 during the last travel section of the piston exhaust stroke. Intake valve 26 of inlet control device 36 is opened after the TDC position of the exhaust stroke. Setting of opening timing is such that inlet control device 36 is allowed to open after almost all of work done by piston 18 to compress the retained gas has been transferred to energy to move piston 18 in downward direction from the TDC position. Exhaust gas is retained and compressed in cylinder 16 because both outlet and inlet control devices 38 and 36 are allowed to close. Compression of the retained exhaust gas causes an increase in cylinder temperature, which provides advantageous influence on auto-ignition at around top dead center (TDC) of the subsequent compression stroke. In each of FIGS. 30 and 31, various abbreviations are used. INT represents an intake valve, IVO represents intake valve opens, IVC represents intake valve closes, EXH represents an exhaust valve, EVO represents exhaust valve opens, and EVC represents exhaust valve closes. O/L represents an overlap between INT and EXH. Minus OIL represents a minus overlap when both EXH and INT close. Provision of such minus OIL around TDC of exhaust stroke is intended to retain exhaust.

For understanding of auto-ignition of gasoline fuel by retaining exhaust gas, reference should be made to the commonly assigned pending U.S. Pat. application Ser. No. 09/767,025 filed Jan. 23, 2001, entitled "SYSTEM AND METHOD FOR AUTO-IGNITION OF GASOLINE INTERNAL COMBUSTION ENGINE", which is hereby incorporated by reference in its entirety.

Adjusting the rotational phase of a camshaft or a cam-driving shaft relative to a crankshaft of an engine is a well-known technique to vary opening and closing timings of a gas exchange valve. Examples of valve controllers employing such technique are shown in U.S. Pat. No. 5,669,343 (Adachi), U.S. Pat. No. 5,836,276 (Iwasaki et al.), and JP-A P2000-73797A. Also known is a technique to adjust the rotational phase of a pivotal cam relative to a crankshaft of an engine. According to this known technique, the valve open duration and valve lift are varied. Examples of valve controllers employing this known technique are shown in U.S. Pat. No. 4,397, 270 (Aoyama), Ronald I. Pierik and Burak A. Gecim "A Low-Friction Variable-Valve-Actuation Device, Part 1: Mechanism Description and Friction Measurements" SAE Paper 970338, 1997, U.S. Pat. No. 5,988,125 (Hara et al.), and JP-A 11-294125. It is also known to electromagentically operate a gas exchange valve. A valve controller employing this technique is shown in U.S Pat. No. 5,785,016 (Enderle et al.).

Any one of the above listed valve controllers may be used in inlet and outlet control devices 36 and 38.

Figure 3:
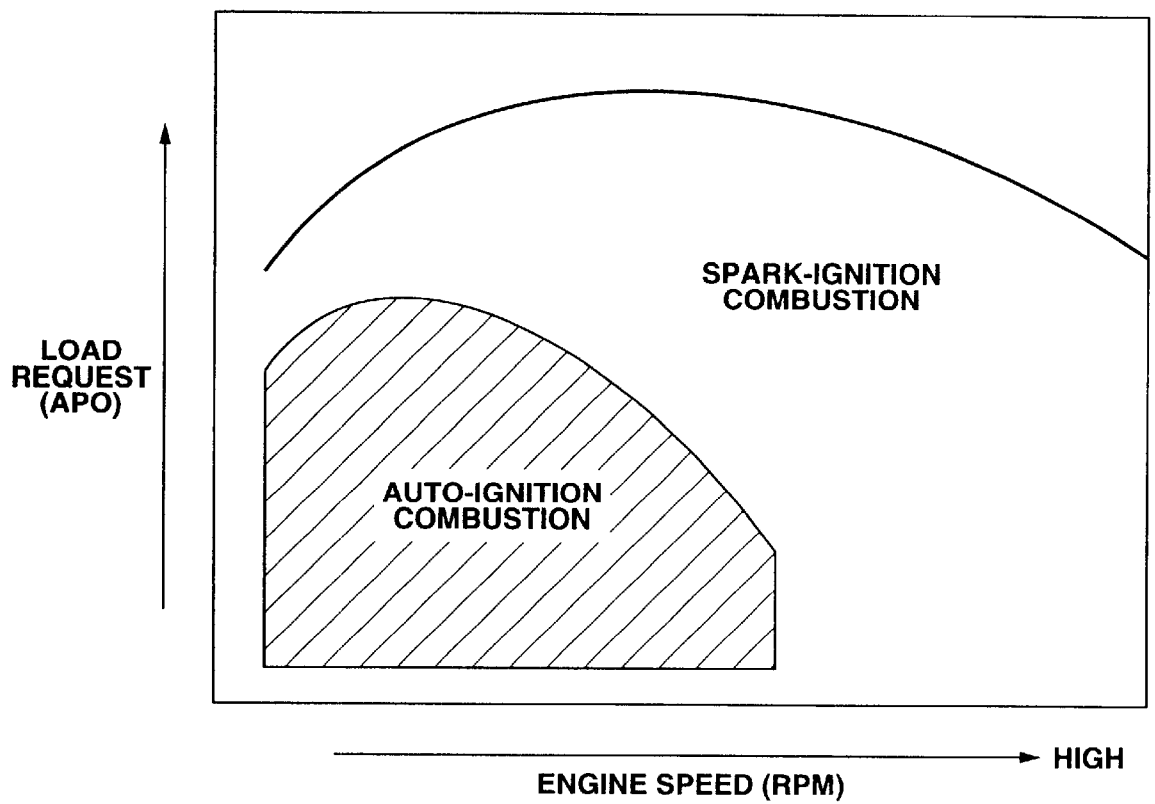
FIG. 3 is a range map illustrating auto-ignition combustion range separated from spark-ignition combustion range.

With reference to FIG. 3, the shadowed area indicates auto-ignition combustion range that covers extended operating conditions. In practical application, auto-ignition combustion is carried out when engine speed and load request fall in the auto-ignition combustion range, and spark-ignition combustion is carried out when engine speed and load request fall in spark-ignition combustion mode.

Figure 4:
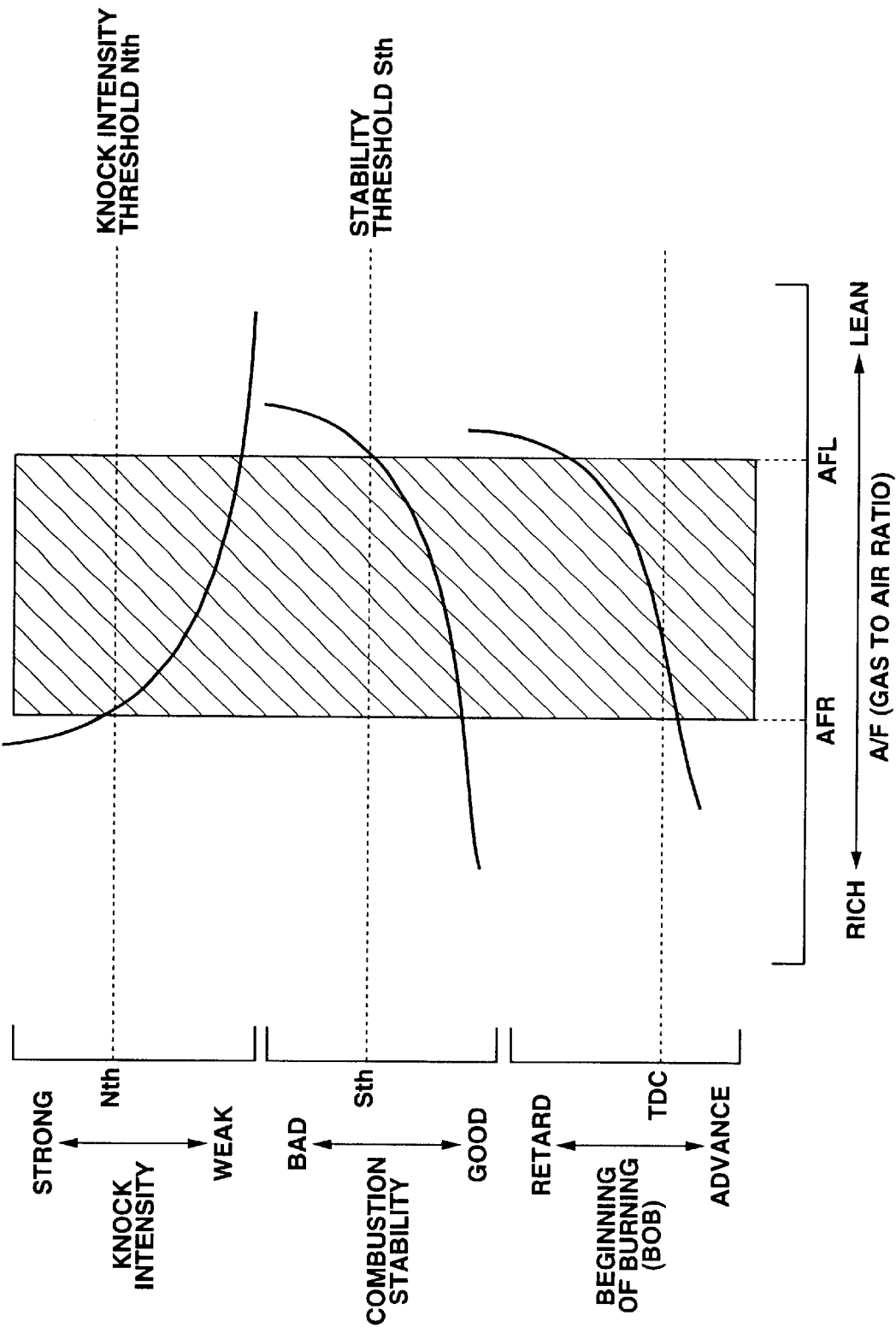
FIG. 4 is a graphical representation of auto-ignition combustion against various air/fuel ratio (A/F) or gas/fuel ratio (G/F).

With reference to FIG. 4, the shadowed area indicates an A/F range where stable auto-ignition is recommended or allowed. Increasing A/F deteriorates combustion stability and increases cyclic dispersion of engine torque. There is a lower limit to levels of combustion stability. Such lower limit is determined after consideration of an allowable deviation from the designed values targeted by an engine and design target of a vehicle powered by the engine. A stability threshold Sth represents such lower limit. A/F reaches a lean limit AFL when combustion stability reaches stability threshold Sth.

Decreasing A/F causes knock intensity to become condensed or strong. When knock intensity reaches a knock intensity threshold Nth, A/F reaches a rich limit AFR. Thus, the rich and lean limits AFR and AFL define therebetween the A/F range where auto-ignition is allowed. In FIG. 4, the horizontal axis represents A/F because gas content of combustion chamber is air only. If the combustion chamber has burnt or EGR gas content as well as air content, the horizontal axis represents a ratio G/F, where G is the total of burnt or EGR gas content and air content. There is a G/F range, which allows auto-ignition in the same manner as the A/F range does.

The A/F or G/F ranges where auto-ignition is allowed are not wide enough. This derives from the fact that a variation of A/F or G/F causes a variation of beginning of burning (BOB) of auto-ignition combustion of main mixture as shown in FIG. 4. The BOB depends on speed of pre-reaction of gasoline fuel, that is, low temperature oxidation reaction. This reaction speed is mainly governed by A/F. If A/F is reduced to obtain a rich mixture, the reaction speed increases. As a result, burning begins at an early crank angle before TDC of compression stroke, causing such rapid burning as to induce knock. If A/F is increased to obtain a lean mixture, the reaction speed drops. As a result, burning begins at a late crank position after TDC of compression stroke. The subsequent descending movement of piston makes it difficult to complete the burning, causing combustion instability.

From the description in connection with FIG. 4, it is now understood that simply increasing fuel quantity for injection to meet increasing load request causes BOB at an early crank angle before TDC of compression stroke. Thus, operating conditions at which auto-ignition combustion may be performed are restricted to lower load due to difficulties in holding BOB within a desired range of crank angles around TDC of compression stroke.

In one embodiment according to the present invention, the fuel injection system 78 is capable of performing a multiple injection in the form of a split injection to adjust BOB take place within desired range of crank angles.

In embodiments according to the present invention, a split injection of gasoline fuel consists of a first injection called the main injection, followed by a delay, and then a second injection referred to as the trigger injection. A trigger injection event takes place at around TDC of compression stroke. A main injection event is separated from the trigger injection event and may take place during induction stroke for creating homogeneous mixture by the time piston 18 reaches TDC of compression stroke. If stratification is desired, the main injection event may take place during first half of compression stroke.

Sufficient mixing of air and fuel due to the trigger injection is not expected. Thus, precise control of fuel quantity q2 for trigger injection is needed to suppress NOx emission.

Control of fuel quantity q1 for main injection is needed to supply fuel as much as possible such that the mixture will not burn until piston reaches a crank angles falling in the desired range for BOB. Heat and pressure generated by burning of fuel by trigger injection cause the mixture to burn from many ignition sites.

Figure 5:
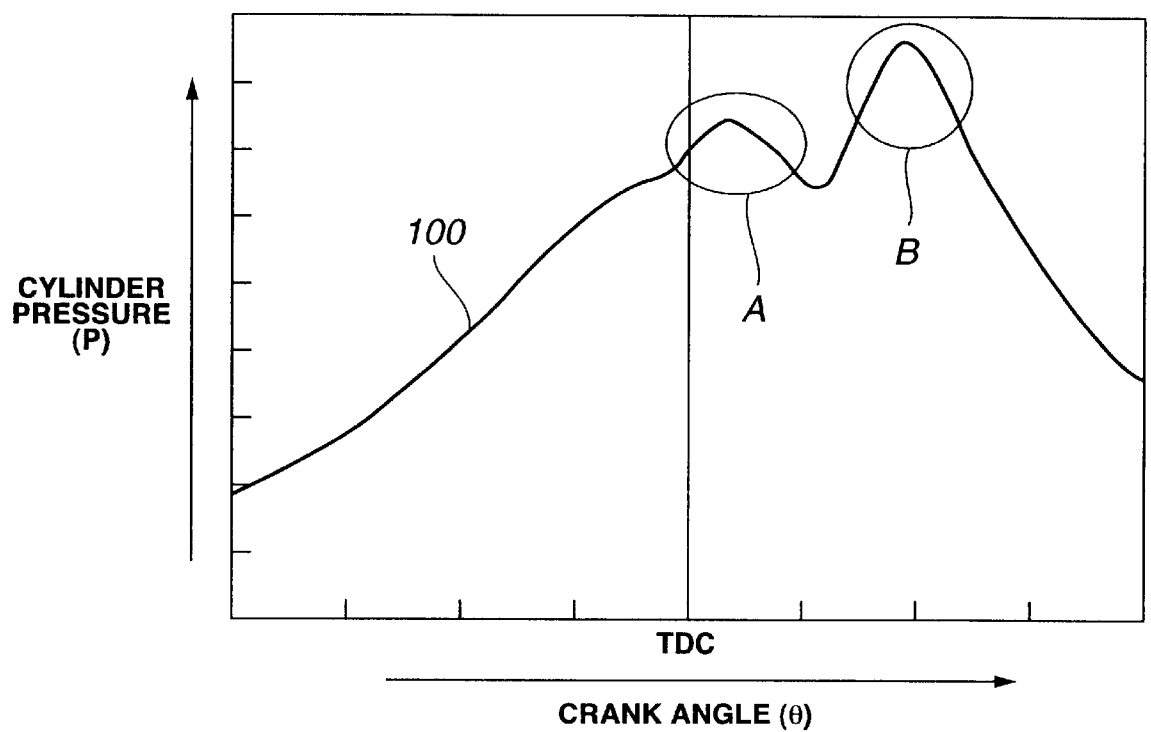
FIG. 5 provides a cylinder pressure curve across TDC of compression stroke, illustrating an auto-ignition combustion event of fuel sprayed by a second injection, called a trigger injection, separated by an ignition delay from a main combustion event of fuel sprayed by a first injection, called a main injection.

With reference to FIG. 5, the illustrated pressure curve 100 clearly indicates that auto-ignition combustion event, as indicated by a circle A, of fuel by trigger injection causes main combustion, as indicated by a circle B, of fuel by main injection. Specifically, heat and pressure generated by mixture created due to trigger injection causes auto-ignition to take place within mixture created due to main injection.

In the embodiments according to the present invention, the desired or target range of crank angles where the main mixture created by main injection begins burning is after TDC of compression stroke. Injection timing IT2 for trigger injection is around TDC of compression stroke so that precise control of BOB of the main mixture may be achieved.

Figure 6:
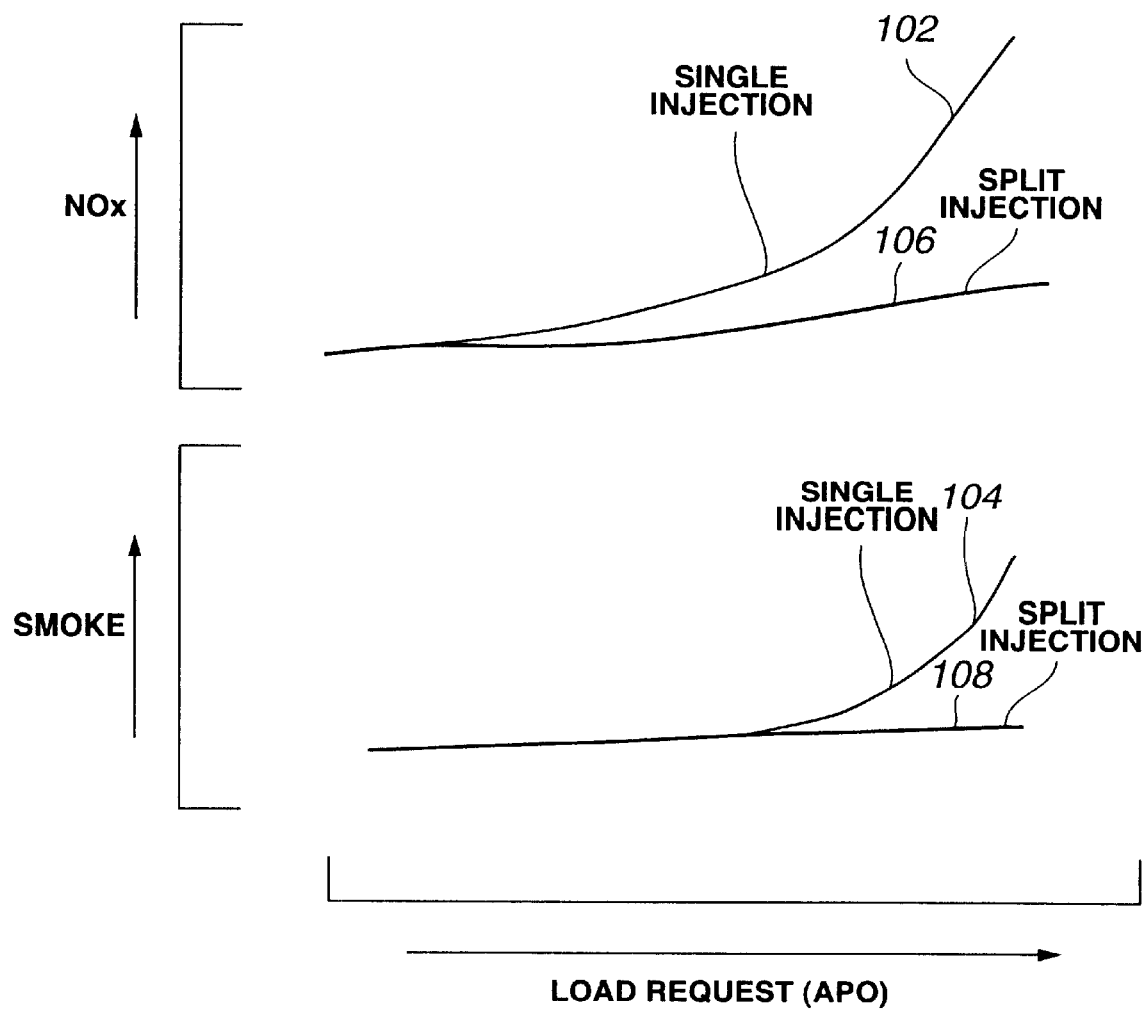
FIG. 6 is a graphical representation of NOx emission and smoke emission against load request in the case of split injection as well as in the case of single injection.

Referring to FIG. 6, the illustrated curves 102 and 104 show variations of NOx emission and smoke against variation of load request when fuel quantify q to meet load request is delivered by a single injection. The illustrated curves 106 and 108 show variations of NOx and smoke against variation of load request when fuel quantity q is split into fuel quantity q1 for main injection and fuel quantity q2 for trigger injection. FIG. 6 clearly reveals that split injection is advantageous over single injection when load request exceeds a predetermined value. In other words, single injection is disabled when load request exceeds the predetermined value and split injection is enabled to achieve auto-ignition combustion with low NOx emission and smoke.

Figure 7:
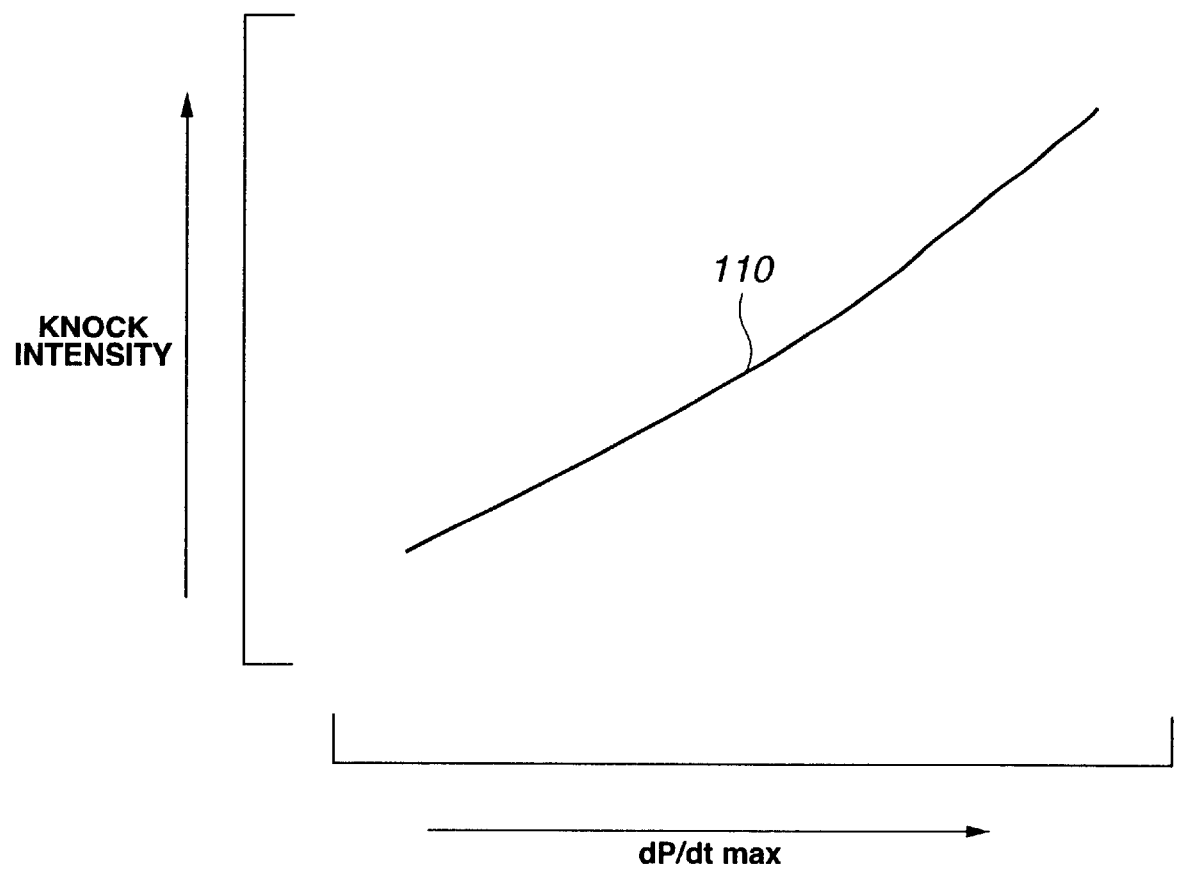
FIG. 7 is graphical representation of knock intensity against maximum rate of change of cylinder pressure dP/dtmax in one cycle.

As mentioned before in connection with FIG. 4, knock intensity becomes strong as air fuel (A/F) ratio of mixture is decreased. The knock intensity has a generally linear relationship with the maximum rate of change of cylinder pressure dP/dtmax in one cycle as indicated by the illustrated curve 110 in FIG. 7. Curve 110 clearly indicates that suppressing dP/dtmax may lower the knock intensity.

Figure 8:
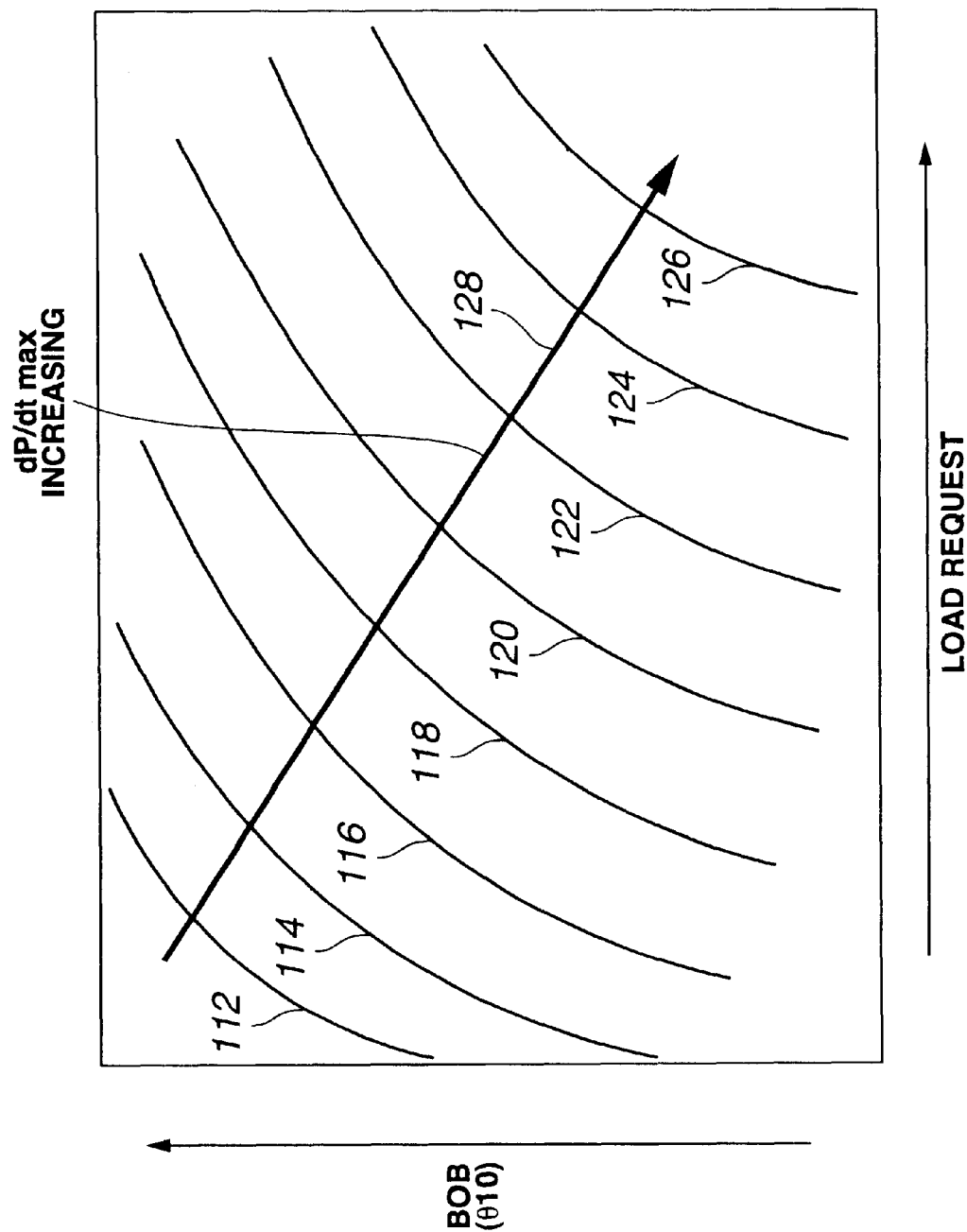
FIG. 8 is a graphical representation of variation of maximum rate of change of cylinder pressure dP/dtmax against variation of beginning of burning (BOB) and load request, illustrating that, with the same maximum rate of change of cylinder pressure dP/dtmax, load request may be extended toward full load if BOB is retarded from TDC of compression stroke.

With reference to FIG. 8, a number of lines 112, 114, 116, 118, 120, 122, 124, and 126 are illustrated, each line connecting equal value of dP/dtmax against load request and BOB. The values represented by these lines increases as operation point shifts in a direction as indicated by an arrow 128. The value dP/dtmax increases as load request increases with BOB held the same. This is because fuel quantity to burn increases as load request increases, thus increasing the amount of heat. With the same load request, the value dP/dtmax decreases as BOB is retarded in such a direction as to increase crank angle. This is because combustion takes place during downward stroke of piston 18.

In FIG. 8, the vertical axis represents θ10 as BOB. The parameter θ10 represents a crank angle at which 10% of the whole fuel has burned and used to represent BOB. Alternatively, other parameters which may be used to represent BOB include θ20, θ50, Pmax, dP/dtmax, dQjdtmax, and dQ/domax as well known to those skilled in the art. Values θ20 and θ50 indicate crank angles at which 20% and 50% of the whole fuel have burned, respectively. Value Pmax indicates crank angle at which cylinder pressure P hits the maximum in one cycle. Value dP/dθmax indicates crank angle at which rate of change of cylinder pressure dP/do hits the maximum in one cycle. Value dQ/dθmax indicates crank angle at which rate of change of heat dQ/dθ hits the maximum.

FIG. 8 clearly reveals that a retard in BOB corresponding to an increase in load request works to suppress knock intensity toward an allowable level, allowing operating conditions at which auto-ignition combustion may be performed to extend to higher load request.

Figure 9:
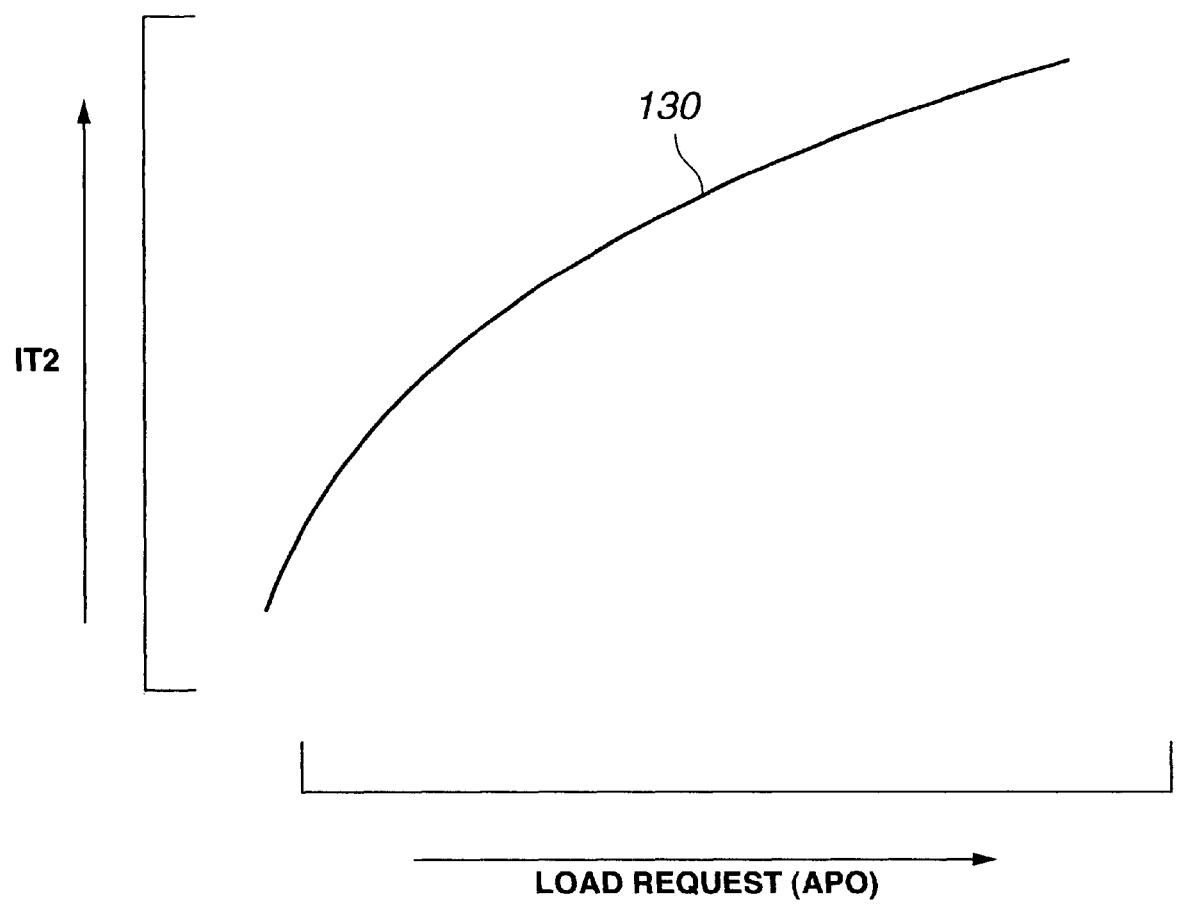
FIG. 9 is a graphical representation of variation, in retard from bottom dead center (BDC) of induction stroke, of injection timing IT2 for trigger injection event against variation of load request according to first embodiment of the present invention.

In the embodiment, load request determines injection timing IT2 for trigger injection using the illustrated relationship as indicated by a curve 130 in FIG. 9. The crank angles on curve 130 are determined against varying load request to provide an appropriate retard of BOB corresponding to an increase in load request to suppress increase in dP/dtmax as discussed in connection with FIG. 8. The values on curve 130 are stored in computer readable storage medium 66 in a map against various value of load request. Thus, appropriate values of injection timing IT2 for trigger injection may be found in the map using different values of load request.

Figure 10:
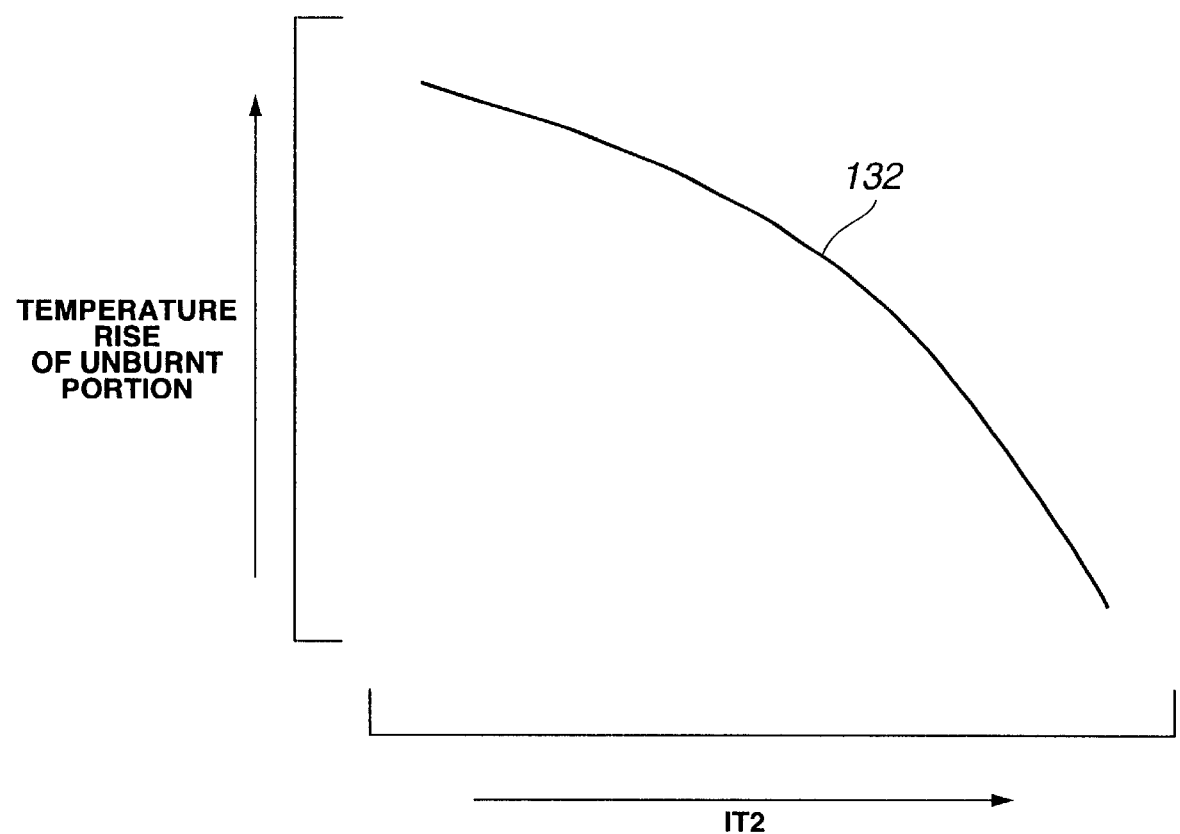
FIG. 10 is a graphical representation of variation of temperature rise of unburnt portion against variation, in retard from BDC of induction stroke, of injection timing IT2 for trigger injection.

With the same fuel quantity q2 for trigger injection, moving injection timing IT2 in such a direction as to retard BOB from TDC of compression stroke increases difficulties for unburnt portion to burn. This is because temperature rise of unburnt portion decreases as injection timing IT2 for trigger injection moves in such direction as to retard BOB from TDC of compression stroke as indicated by the illustrated curve 132 in FIG. 10. Cylinder volume increases as crank position is retarded from TDC of compression stroke, suppressing a pressure rise even if the amount of heat generated remains the same. As a result, effect of adiabatic compression of unburnt gas becomes small, causing a reduction of temperature rise.

In the embodiment, fuel quantity q2 is increased to generate increased amount of heat to compensate for a reduction in temperature rise of unburnt portion caused due to a retard of injection timing IT2 for trigger injection from TDC of compression stroke.

Figure 11:
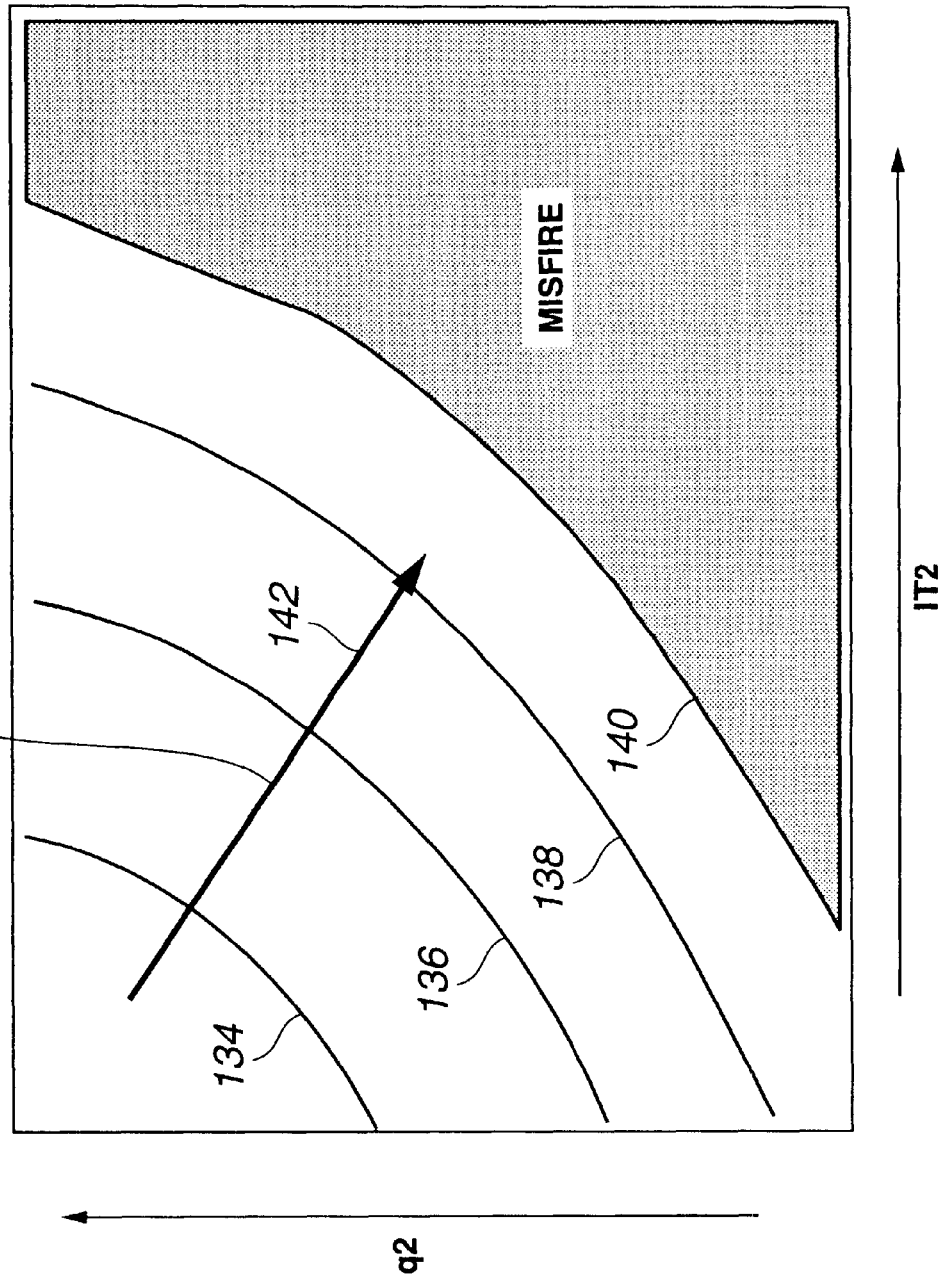
FIG. 11 is a graphical representation of variation, in retard from TDC of compression stroke, of BOB against variation, in retard from BDC of induction stroke, of IT2 for trigger injection event and fuel quantity q2 for trigger injection event, illustrating that, with the same BOB, IT2 may be retarded from toward a misfire limit if q2 is increased.

With reference to FIG. 11, a plurality of lines 134, 136, 138, and 140 are illustrated, each line connecting equal crank angle at which BOB takes place against injection timing IT2 and fuel quantity q2 for trigger injection. The crank angles represented by these lines increase as operation point shifts in a direction as indicated by an arrow 142 toward misfire zone as indicated by the shadowed area.

FIG. 11 clearly shows that if a need arises to retard BOB from TDC of compression stroke considerably, fuel quantity q2 for trigger injection needs to be increased to avoid misfire. In the embodiment, fuel quantity q2 is varied in coordination with variation of fuel injection IT2 in controlling BOB within the target range of crank angles after TDC of compression stroke.

The preceding description on the embodiment clearly teaches that a retard in injection timing IT2 for trigger injection causes a retard in BOB. This relation may be broken in some cases where a retard in injection timing IT2 for trigger injection causes an advance in BOB. If dispersion of fuel is not sufficient to leave local rich portions, burning of such rich portions causes advance of BOB even if there is a retard in injection timing IT2 for trigger injection. In such cases, injection timing IT2 for trigger injection may be advanced to cause a retard in BOB.

Figure 12:
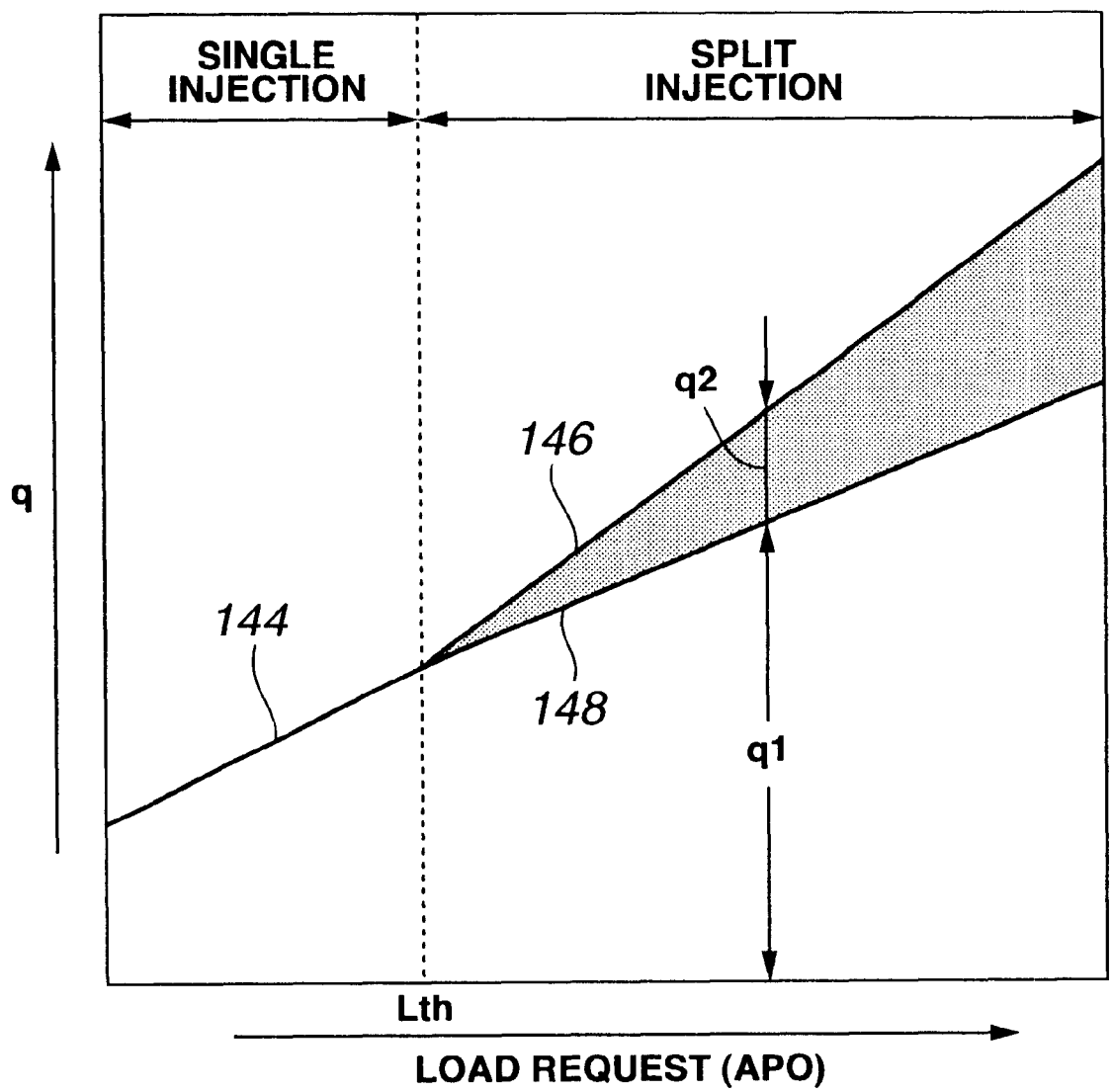
FIG. 12 is a graphical representation of variation of fuel quantity for injection against variation of load request according to the first embodiment of the present invention, illustrating an increase in fuel quantity q2 for trigger injection as load request becomes high under condition wherein injection timing IT2 is retarded from TDC of compression stroke as shown in FIG. 9.

Referring to FIG. 12, single injection is enabled when load request is sufficiently low and falls below a predetermined value, called a load threshold Lth, and disabled when load request exceeds load threshold Lth. When load request exceeds load threshold Lth, split injection is enabled. Disabling single injection in this manner and utilizing split injection enhances engine operation on auto-ignition combustion with low NOx emission and smoke (see FIG. 6) at higher load request. Split injection is disabled when load request falls below load threshold Lth, while utilizing single injection at lower load request. The hysteresis may be provided to prevent rapid switch between single injection and split injection.

It is to be appreciated that the language "load request exceeds the load threshold" is meant to encompass other equivalent control implementation as would be appreciated by one of ordinary skill in fuel injection system art. For example, comparison may be of the "greater than or equal to" type, which is considered equivalent and meant to be encompassed by the language "load request exceeds the load threshold."

With continuing reference to FIG. 12, the illustrated line segment 144 connects desired values of total fuel quantity q for single injection against varying load request that fall below load threshold Lth. The illustrated line segment 146 connects desired values of total fuel quantity q for split injection at higher load request. The illustrated line segment 148 connects fuel quantity q1 for main injection. These values are stored in computer readable storage medium 66 in a map against varying value of load request. Fuel quantity q2 for trigger injection may be determined by subtracting fuel quantity q1 from total fuel quantity q, which may be found in the map. Alternatively, appropriate values of fuel quantity q2 for trigger injection may be found in a map stored in computer readable storage medium 66. As explained before in connection with FIG. 9, injection timing IT2 for trigger injection is shifted to retarded setting as load request becomes high. Further, fuel quantity q2 for trigger injection needs to be increased corresponding to retard setting of injection timing IT2 as explained in connection with FIG. 11. Accordingly, as illustrated in FIG. 12, fuel quantity q2 for trigger injection increases as engine load increases. Excessive increase of fuel quantity q2 for trigger injection may cause an increase in NOx emission and smoke. To avoid this situation, both fuel quantity q2 for trigger injection and fuel quantity q1 for main injection are increased within the framework of total fuel quantity at high load request.

Figure 13:
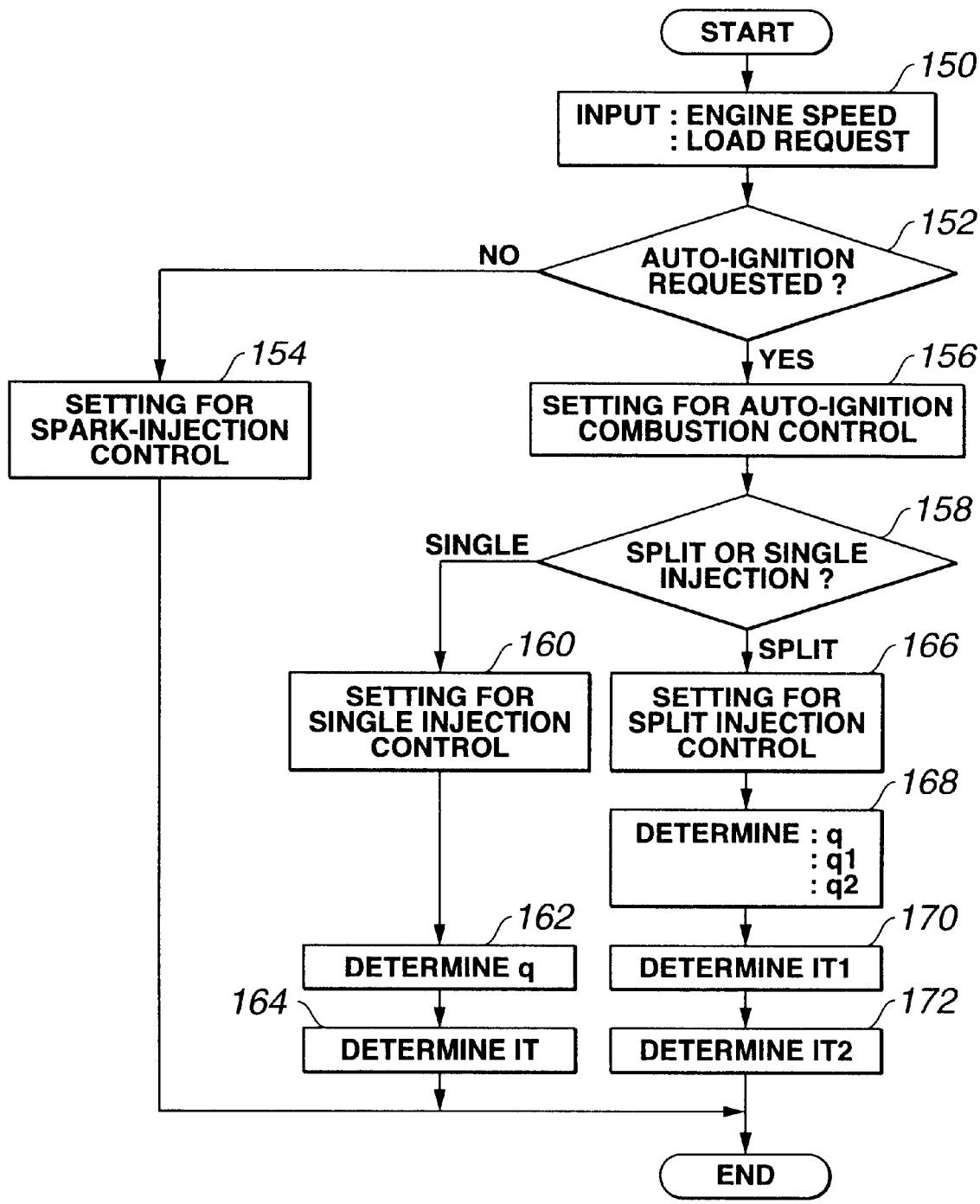
FIG. 13 is a flow chart of a controller routine for operating the first embodiment of the present invention.

FIG. 13 illustrates a controller routine for operating the embodiment of the present invention. In step 150, controller 14 input engine speed and load request. In step 152, controller 14 refers to FIG. 3 based on the engine speed and load request to determine whether or not auto-ignition is requested. If this is not the case, control goes to step 154. In step 154, controller 14 sets valve timings as illustrated in FIG. 30. If this is the case, control goes from step 152 to step 156. In step 156, controller 14 sets valve timings as illustrated in FIG. 31 for auto-ignition combustion. In the next step 158, controller 14 refers to FIG. 12 to determine whether a single injection or a split injection is requested. As explained before in connection with FIG. 12, controller 14 compare the load request to road threshold Lth to determine that split injection is to be enabled when load request exceeds load threshold Lth and to determine single injection is to be disabled when load request falls below load threshold Lth.

If single injection is to be enabled in step 158, control goes to step 160. In step 160, controller 14 provides setting for single injection control. Specifically, controller 14 determines fuel quantity q for single injection in step 162 by performing a table look-up operation of line segment 144 in FIG. 12 against load request. Controller determines injection timing IT for single injection in step 164. This injection timing It may be fixed.

If split injection is to be enabled in step 158, control goes to step 166. In step 166, controller 14 provides setting for split injection control. In the next step 168, controller determines total fuel quantity q, fuel quantity q1 for main injection, and fuel quantity q2 for trigger injection by performing a table look-up operation of line segments 146 and 148 in FIG. 12. In the next step 170, controller 14 determines injection timing IT1 for main injection. In the next step 172, controller 14 determines injection timing IT2 for trigger injection by performing a table look-up operation of FIG. 9 against load request. In the embodiment, injection timing IT1 for main injection falls in induction stroke well before TDC of compression stroke, while injection timing IT2 for trigger injection falls in a range from 60 degrees before top dead center (BTDC) of compression stroke to 10 degrees from BTDC.

Figure 14:
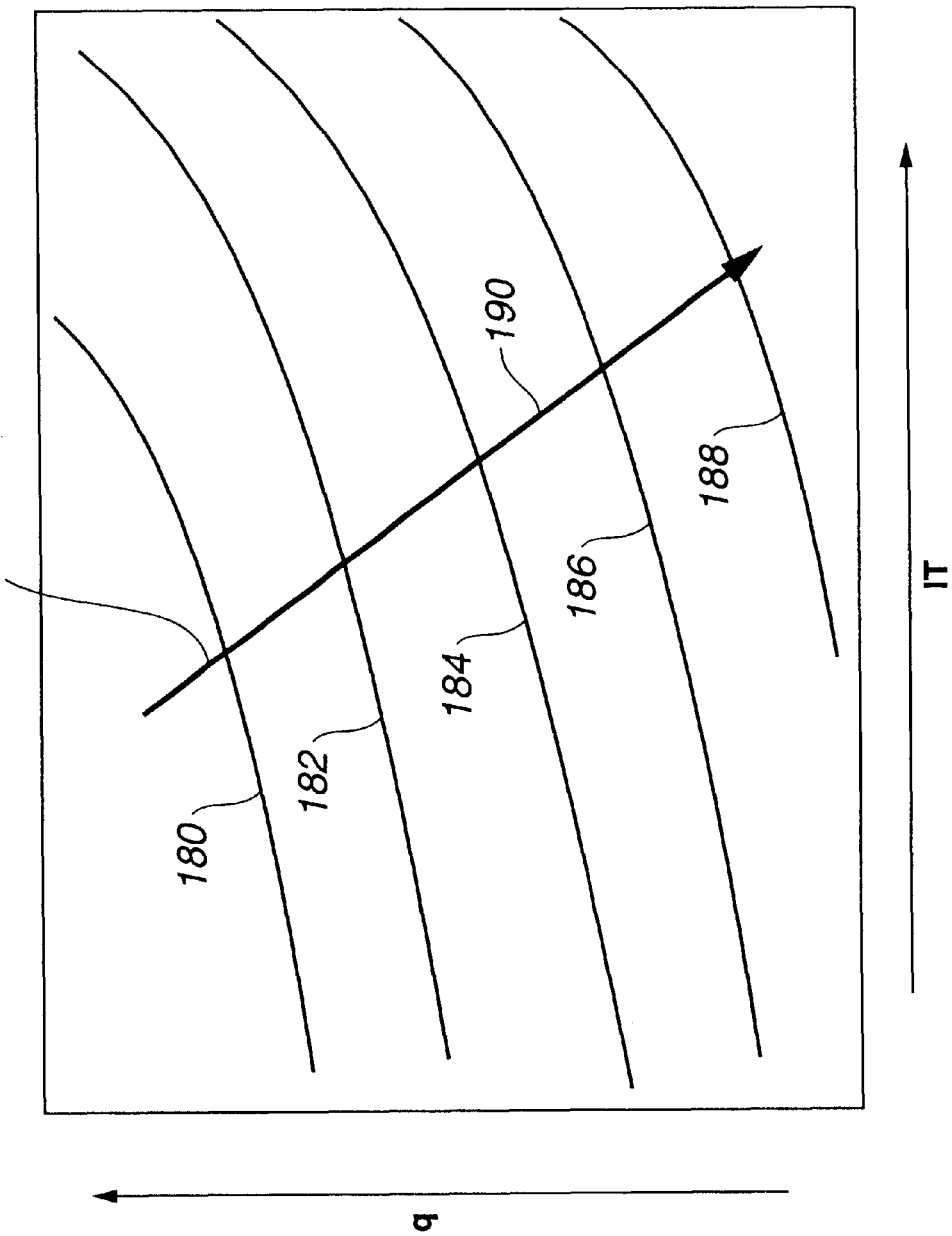
FIG. 14 is a graphical representation of variation of BOB against variation of injection timing IT and fuel quantity q for a single injection event that occurs well before TDC of compression stroke, illustrating that, with the same BOB, fuel quantity q can be increased if injection timing IT is retarded.
Figure 15:
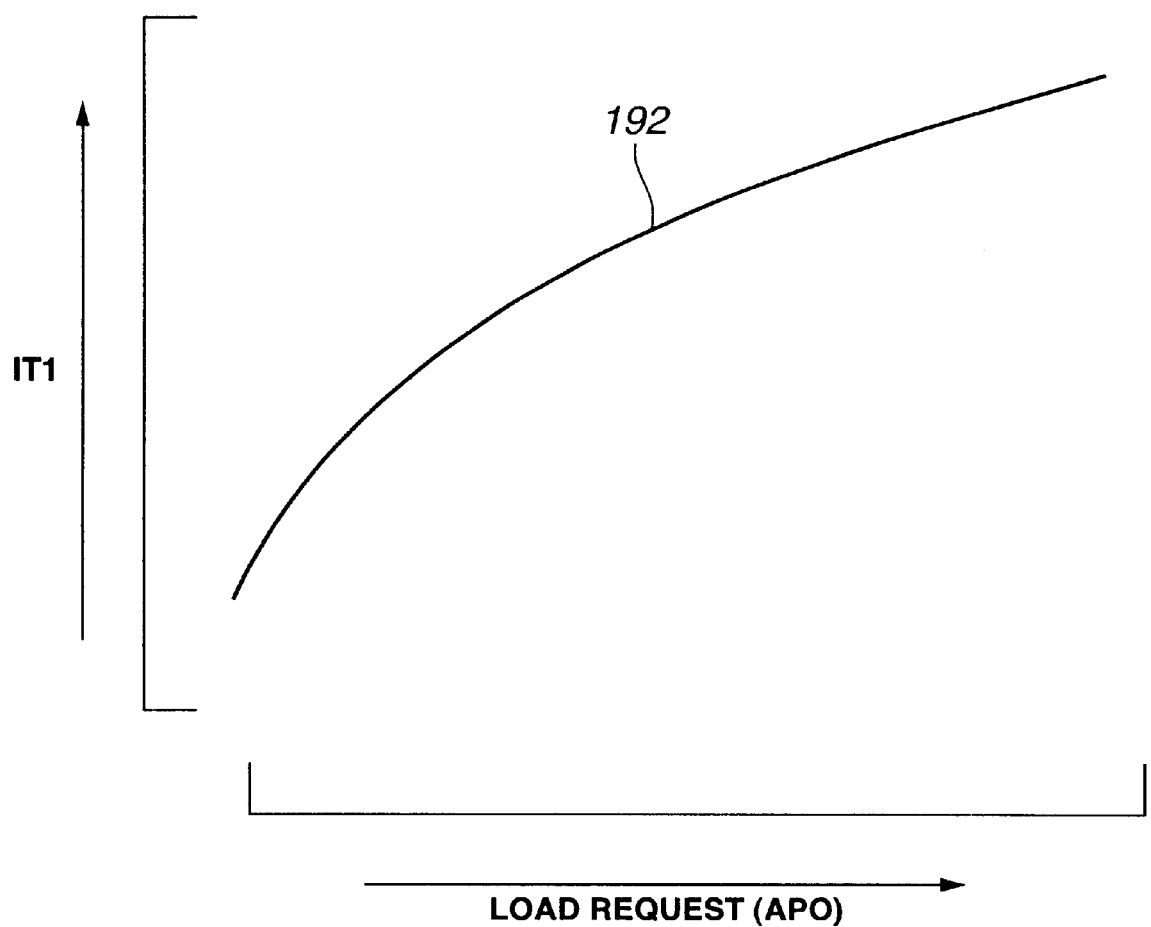
FIG. 15 is a graphical representation of variation, in retard toward TDC of compression stroke, of injection timing IT1 for main injection event against variation of load request according to second embodiment of the present invention.
Figure 16:
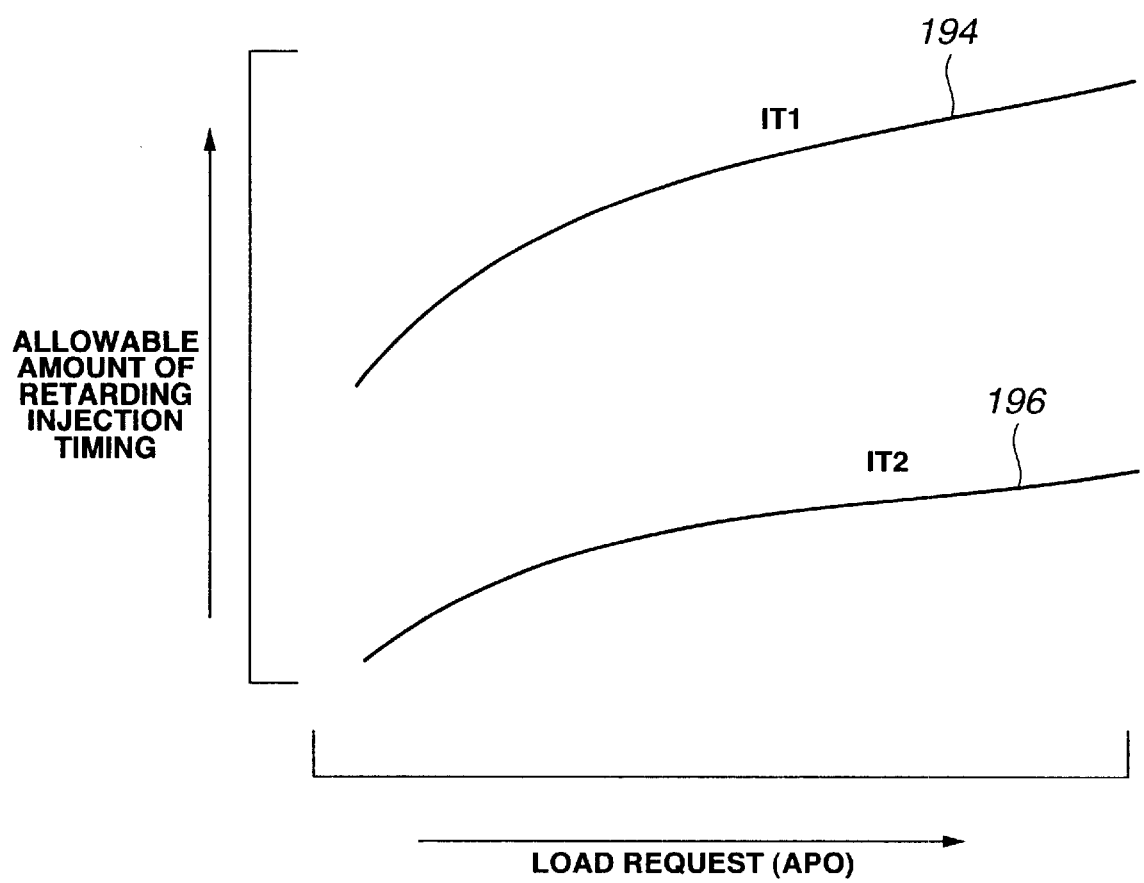
FIG. 16 is a graphical representation of allowable amount of retarding injection timing (IT1, IT2) for each of main and trigger injections against variation of load request.

Referring to FIGS. 14 to 16, second embodiment according to the present invention is described.

The second embodiment is substantially the same as the first embodiment described previously in connection with FIGS. 1 to 13. However, the second embodiment is different from the first embodiment in that injection timing IT1 and fuel quantity q1 for main injection are varied against variation of load request in addition to the variation of injection timing IT2 and fuel quantity q2 for trigger injection.

As explained before, knock intensity defines a limit of higher load operating conditions at which auto-ignition combustion is achieved. To suppress knock intensity, retarding BOB from TDC of works. As explained before in connection with FIG. 11, a retard of injection timing IT2 and an increase in fuel quantity q2 for trigger injection corresponding to the retard are required to provide a desired retard of BOB. However, as explained before in connection with FIG. 6, there is a limit to increasing fuel quantity q2 for trigger injection because heterogeneous mixture with local rich portions is created, resulting in increased NOx emission and smoke. Accordingly, to extend operating conditions at which auto-ignition combustion is achieved to higher load request, it is necessary to increase fuel quantity q1 for main injection.

As mentioned before, fuel quantity q1 for main injection is restricted below a limit such that mixture due to fuel supplied by main injection is prevented from burning before a target crank angle at which BOB is to take place. With fuel quantity qu exceeding this limit, the mixture burns before the target crank angle at which BOB is to take place, causing knock to occur due to rapid burning.

Fuel by main injection is vaporized,. and then mixed with air to create mixture. Finally, fuel is reacted with oxygen and ignited. If time required for this series of processes remains the same, retarding injection timing provides retarded BOB.

FIG. 14 provides variation of BOB against variation of injection timing IT and fuel quantity q for a single injection event that occurs well before TDC of compression stroke, illustrating that, with the same BOB, fuel quantity q can be increased if injection timing IT is retarded. Thus, operating conditions at which auto-ignition combustion can be achieved may be extended to higher load request. In FIG. 14, a plurality of lines 180, 182, 184, 186, and 188 are illustrated, each line connecting equal crank angle at which BOB occurs against injection timing IT and fuel quantity q for single injection. The crank angles represented by these lines increase as operation point shifts in a direction as indicated by an arrow 190.

In the second embodiment, load request determines injection timing IT1 for main injection using the illustrated relationship as indicated by a curve 192 in FIG. 15. The crank angles on curve 192 are determined against varying load request to provide a tendency to be retarded as load request becomes high. The values on curve 192 are stored in computer readable storage medium 66 in a map against various values of load request. Thus appropriate values of injection timing IT1 for main injection may be found in the map against various values of load request.

In FIG. 16, curves 194 and 196 indicate variations of allowable amounts, by which injection timings IT1 and IT2 for main and trigger injections may be retarded, against variation of load request. As is readily seen from FIG. 16, at each of load request, the amount allowed for injection timing IT1 for main injection is greater than the amount for injection timing IT2 for trigger injection. This is because a retard of injection timing IT2 for trigger injection, which is at around. TDC of compression stroke, has a greater influence on BOB than a retard of injection timing IT1, which is at a crank angle well before TDC of compression stroke.

A controller routine for operating the second embodiment is substantially the same as the controller routine illustrated in FIG. 13 except the manner of determining injection timing IT1 for main injection in step 170. In step 170, controller 14 performs a table look-up operation of map as illustrated by curve 192 in FIG. 15 against load request.

With reference to FIGS. 17 to 24, third embodiment according to the present invention is described.

The third embodiment is substantially the same as the first embodiment described previously in connection with FIGS. 1 to 13. However, the third embodiment is different from the first embodiment in that injection timings IT1 and T2 and fuel quantities q1 and q2 are varied against variation of load request and engine speed.

Figure 17:
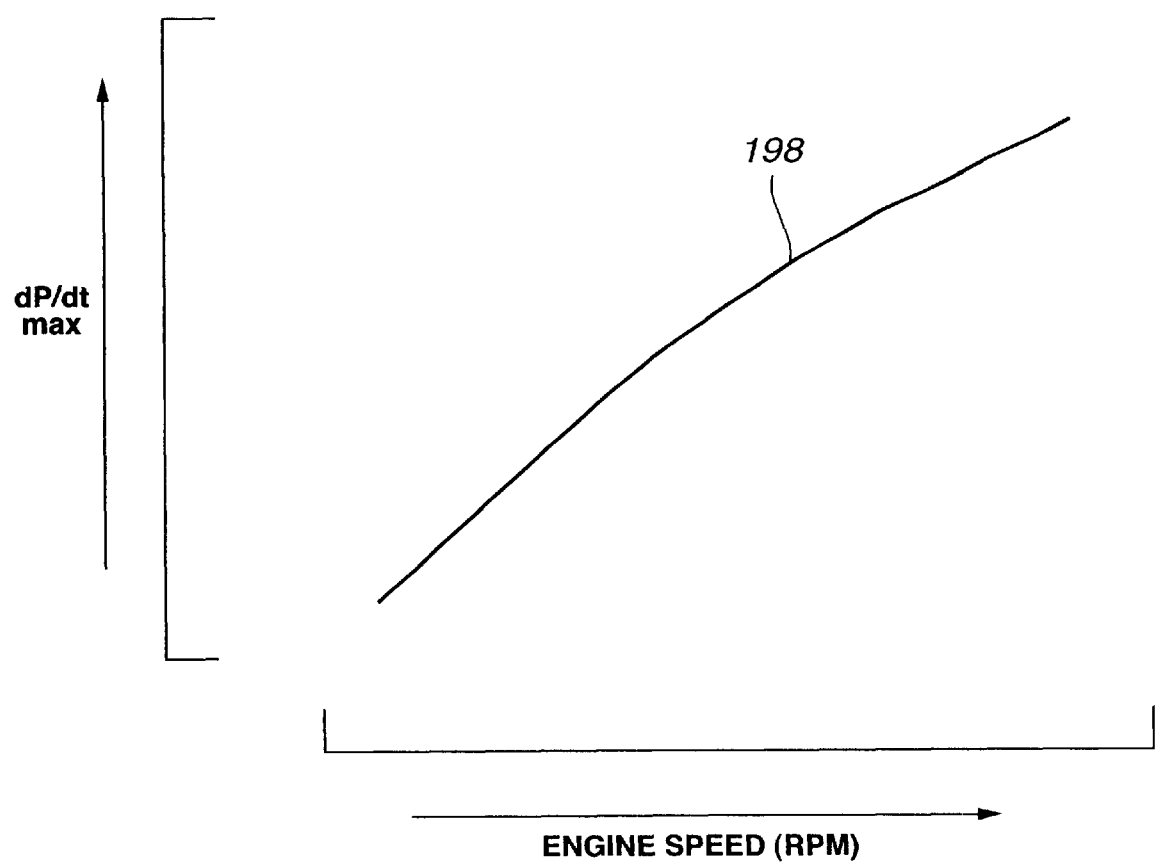
FIG. 17 is a graphical representation of variation of maximum rate of change of cylinder pressure dP/dtmax against variation of engine speed.

Referring to FIG. 17, the maximum rate of change dP/dtmax increases as engine speed increases as illustrated by the curve 198. This curve 198 shows that occurrence of knock is high at high engine speed. Thus, it is necessary to retard BOB from TDC of compression stroke at higher engine speeds.

Figure 18:
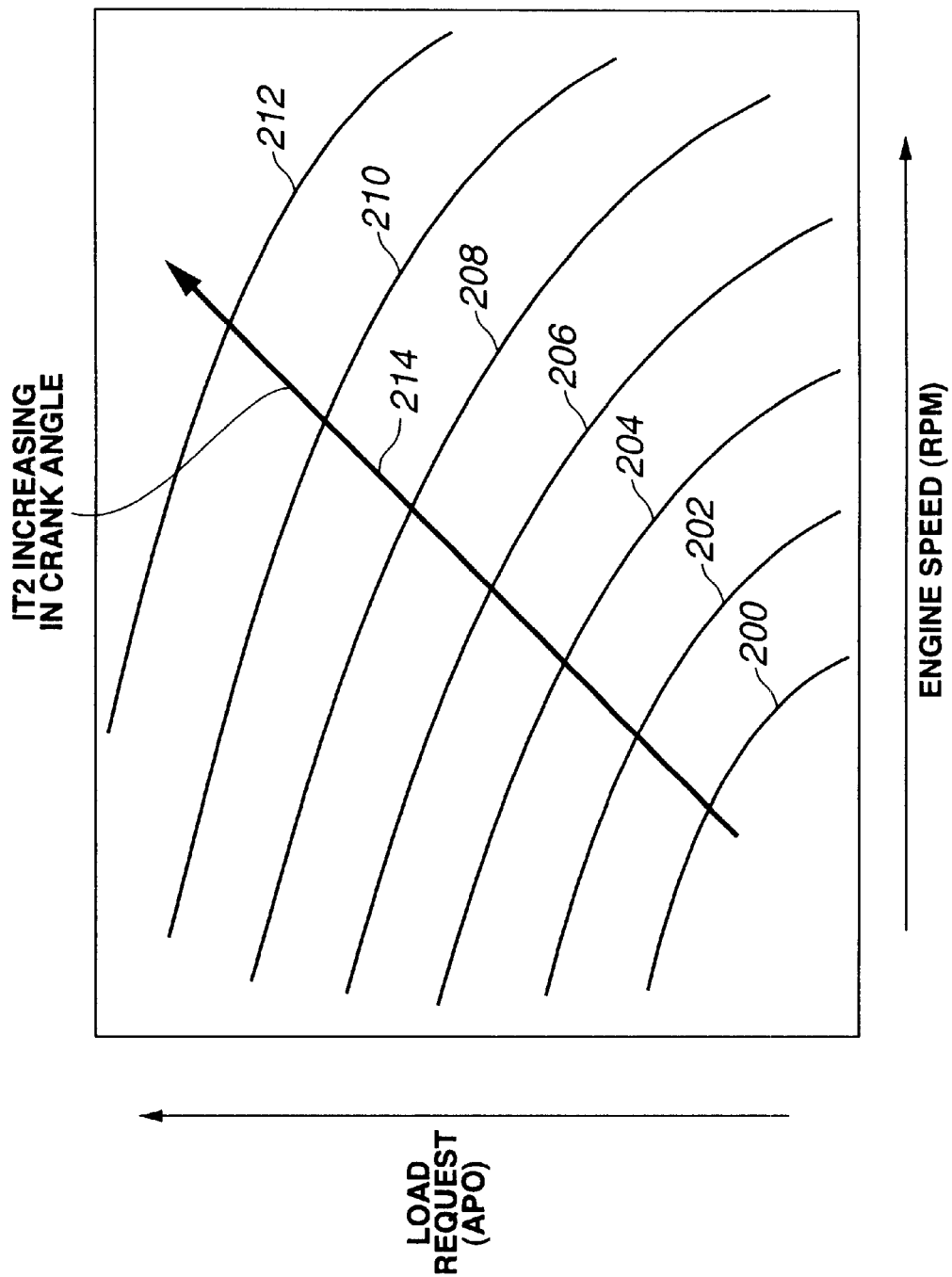
FIG. 18 is a graphical representation of variation, in retard from BDC of induction stroke, of injection timing IT2 for trigger injection event against variation of engine speed and load request according to third embodiment of the present invention

FIG. 18 illustrates variation of injection timing IT2 for trigger injection against various engine speed and load request. As mentioned previously, injection timing IT2 increases in crank angle in a retard direction at higher load request. In the third embodiment, injection timing IT2 increases in crank angle in a retard direction at higher engine speeds. In FIG. 18, a number of lines 200, 202, 204, 206, 208, 210, and 212 are drawn, each line connecting equal crank angle for injection timing IT2 against load request and engine speed. Crank angles on these lines increase as operation point shifts in a direction indicated by an arrow 214. The crank angles on these lines are stored in computer readable storage medium 66 in a map against various values of load request and engine speed. Thus appropriate values of injection timing IT2 for trigger injection may be found in the map against various values of load request and engine speed. Injection timing IT2 for trigger injection is retarded as engine speed becomes high.

Controlling injection timing IT2 for trigger injection can control BOB.

Figure 24:
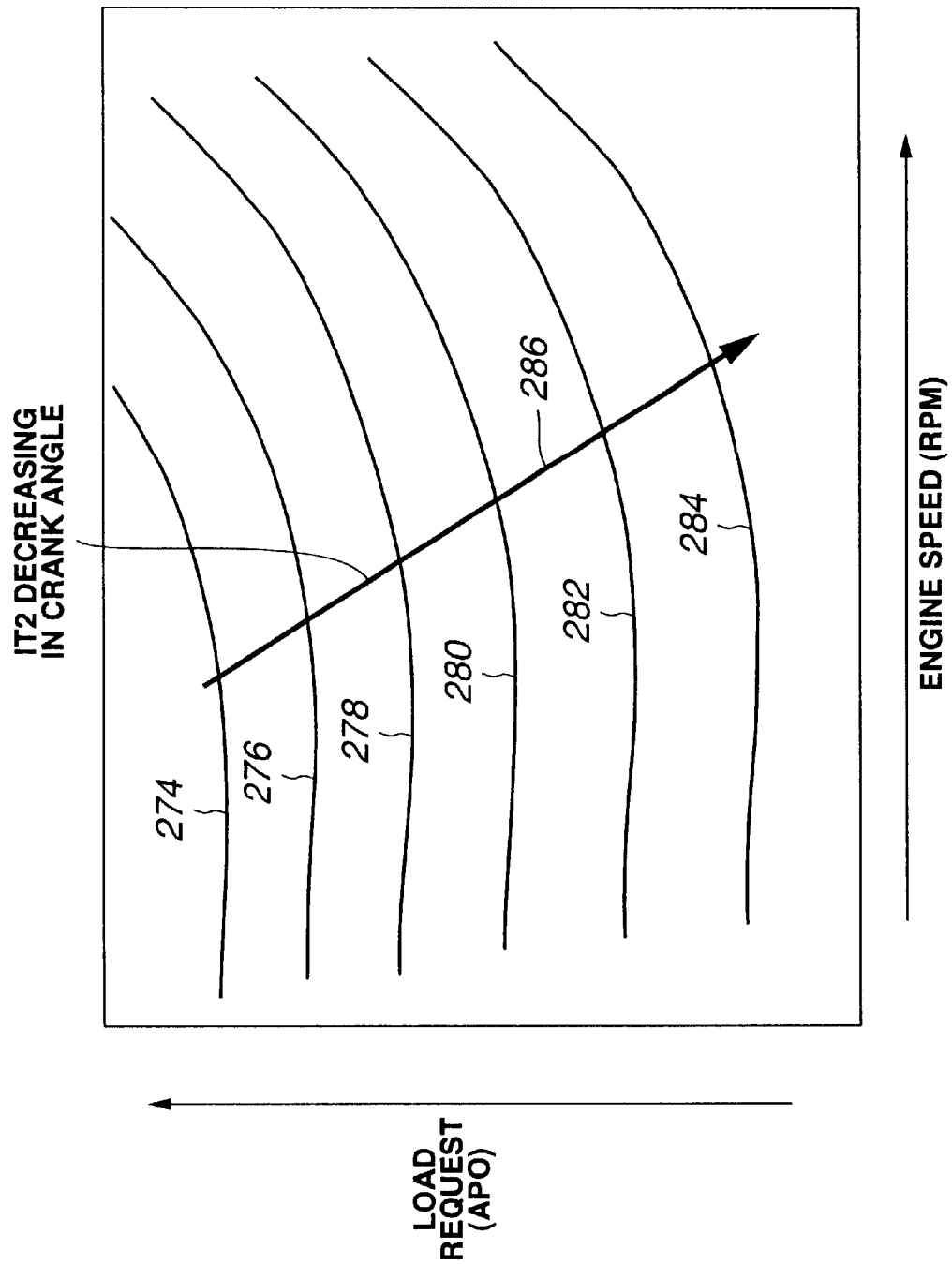
FIG. 24 is a graphical representation of variation of injection timing IT2 for trigger injection against variation of engine speed and load request according to the third embodiment of the present invention.

In the control strategy as illustrated in FIG. 18, it is assumed that BOB may be retarded by retarding injection timing IT2 for trigger injection. This relation may be broken in some cases due to hard components (such as, a fuel delivery system) of the engine. In such cases, another control strategy as illustrated in FIG. 24 may be used to determine IT2 for trigger injection.

Figure 19:
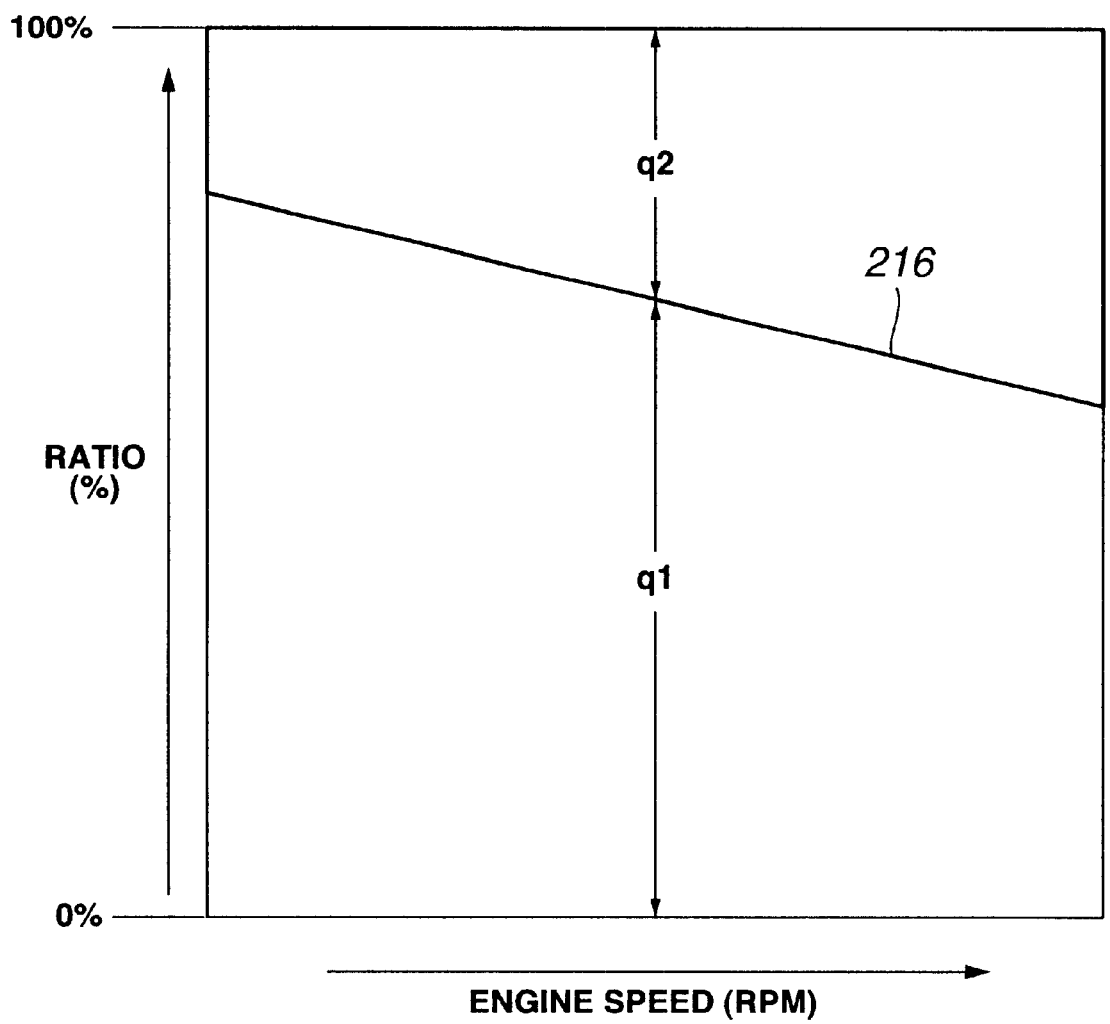
FIG. 19 is a graphical representation of variation of a ratio of fuel quantity q1 for main injection to total fuel quantity (q=q1+q2) against variation of engine speed.

Referring to FIG. 19, the illustrated line 216 shows variation of a ratio of fuel quantity q1 for main injection to total fuel quantity (q=q1+q2) against variation of engine speed with the same load request. Injection timing IT2 for trigger injection is retarded as engine speed becomes high. Fuel quantity q2 must be increased if injection timing IT2 is retarded. Since the total fuel quantity q is kept unaltered, fuel quantity q1 has to be reduced if fuel quantity q2 is increased.

Figure 20:
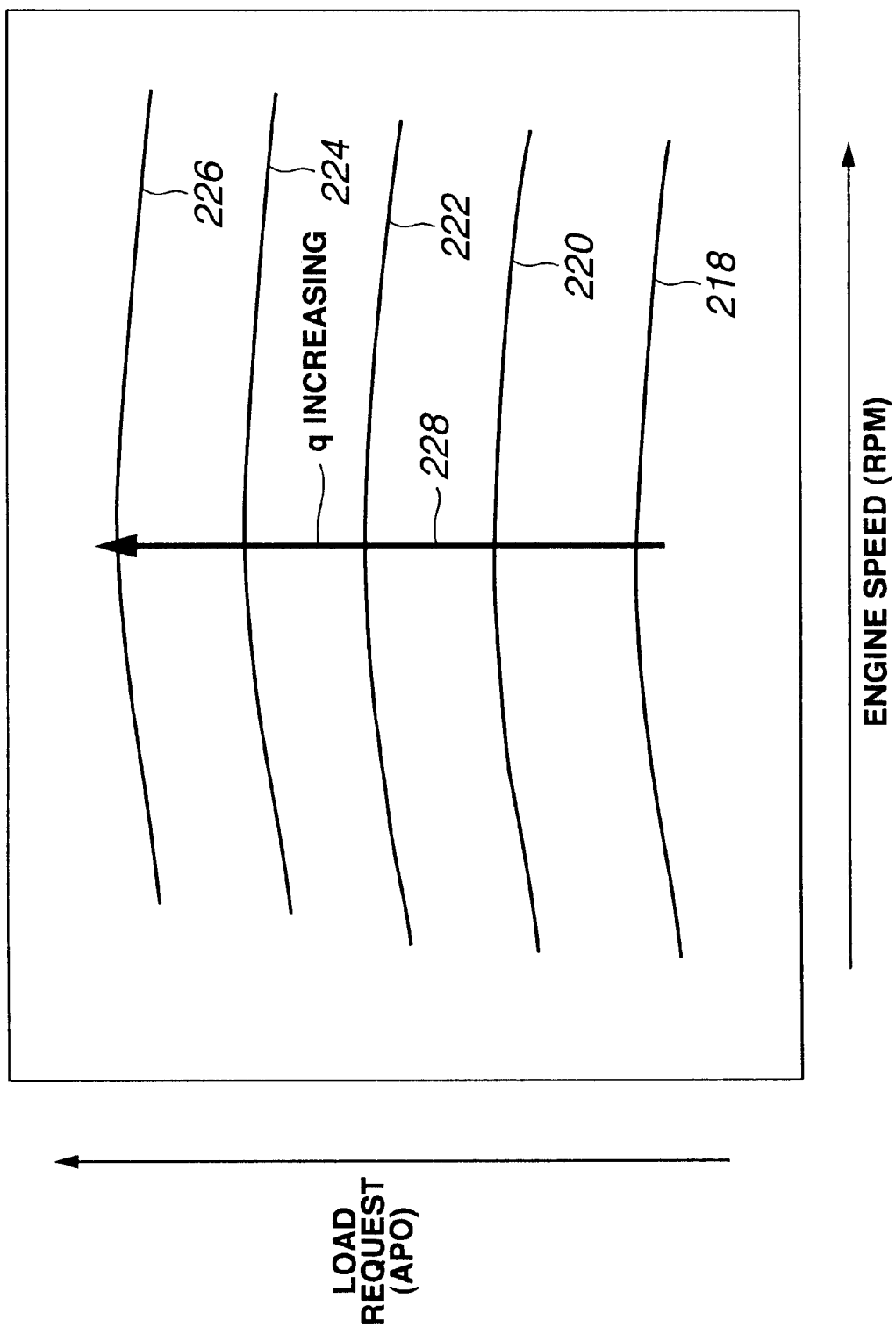
FIG. 20 is a graphical representation of variation of total fuel quantity q for injection against variation of engine speed and load request, illustrating that variation of engine speed has less influence on variation of the total fuel quantity than variation of load request.

FIG. 20 provides variation of total fuel quantity q for injection against variation of engine speed and load request, illustrating that variation of engine speed has less influence on variation of the total fuel quantity than variation of load request. In FIG. 20, a plurality of lines 218, 220, 222, 224, and 226 are illustrated, each line connecting equal value of total fuel quantity against variation of load request and engine speed. The values on these lines increase as operation point shifts in a direction as indicated by an arrow 228.

Figure 21:
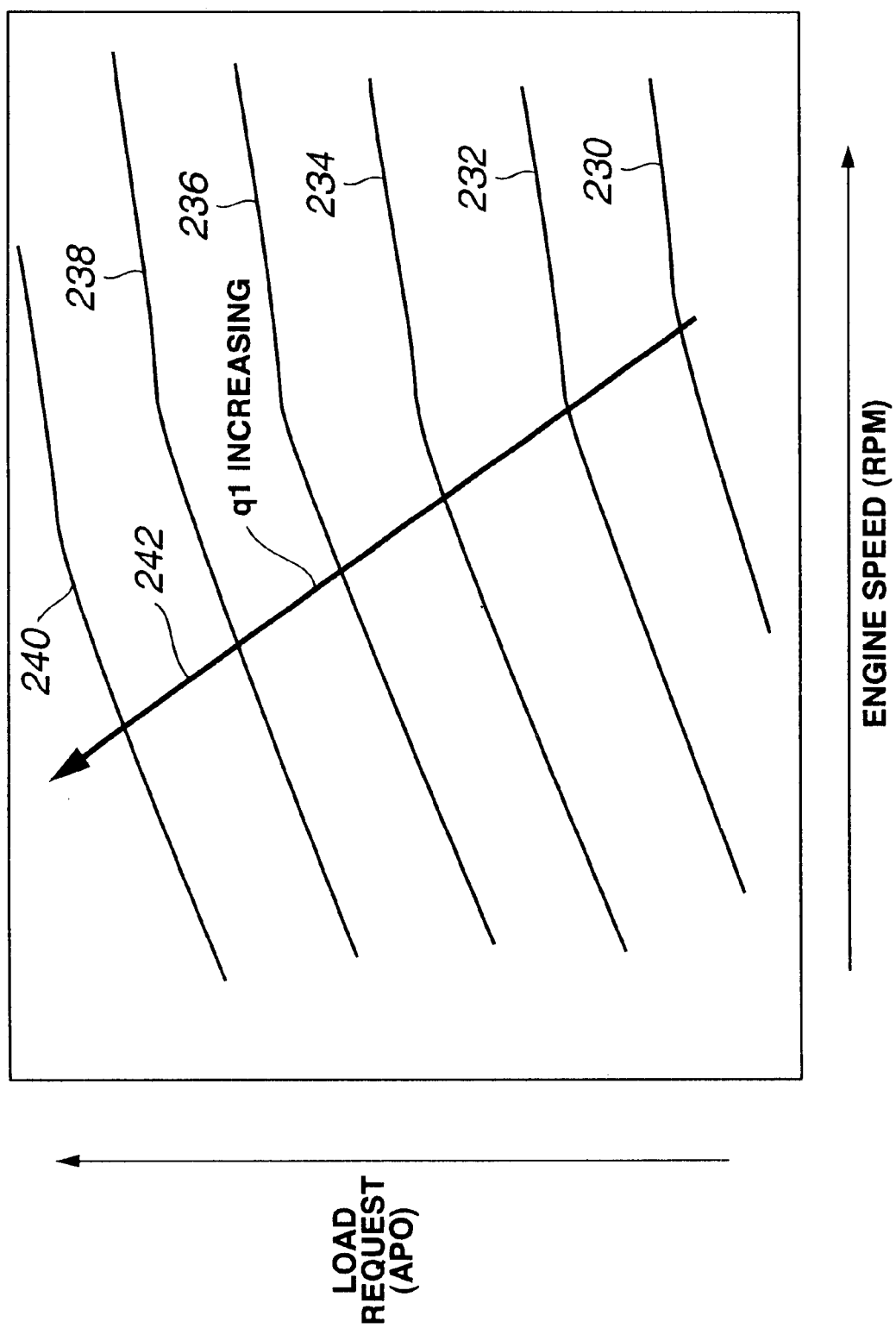
FIG. 21 is a graphical representation of variation of fuel quantity q1 for main injection against variation of engine speed and load request according to the third embodiment of the present invention.

FIG. 21 provides variation of fuel quantity q1 for main injection against variation of engine speed and load request In 21, a plurality of lines 230, 232, 234, 236, 238, and 240 are illustrated, each line connecting equal value of fuel quantity qu for main injection. The values on these lines increase as operation point shifts in a direction as indicated by an arrow 242. These values are stored in computer readable storage medium 66 in a map against various values of load request and engine speed. Thus appropriate values of fuel quantity q1 for main injection may be found in the map against various values of load request and engine speed. Fuel quantity q1 for main injection increases as engine speed becomes high.

Figure 22:
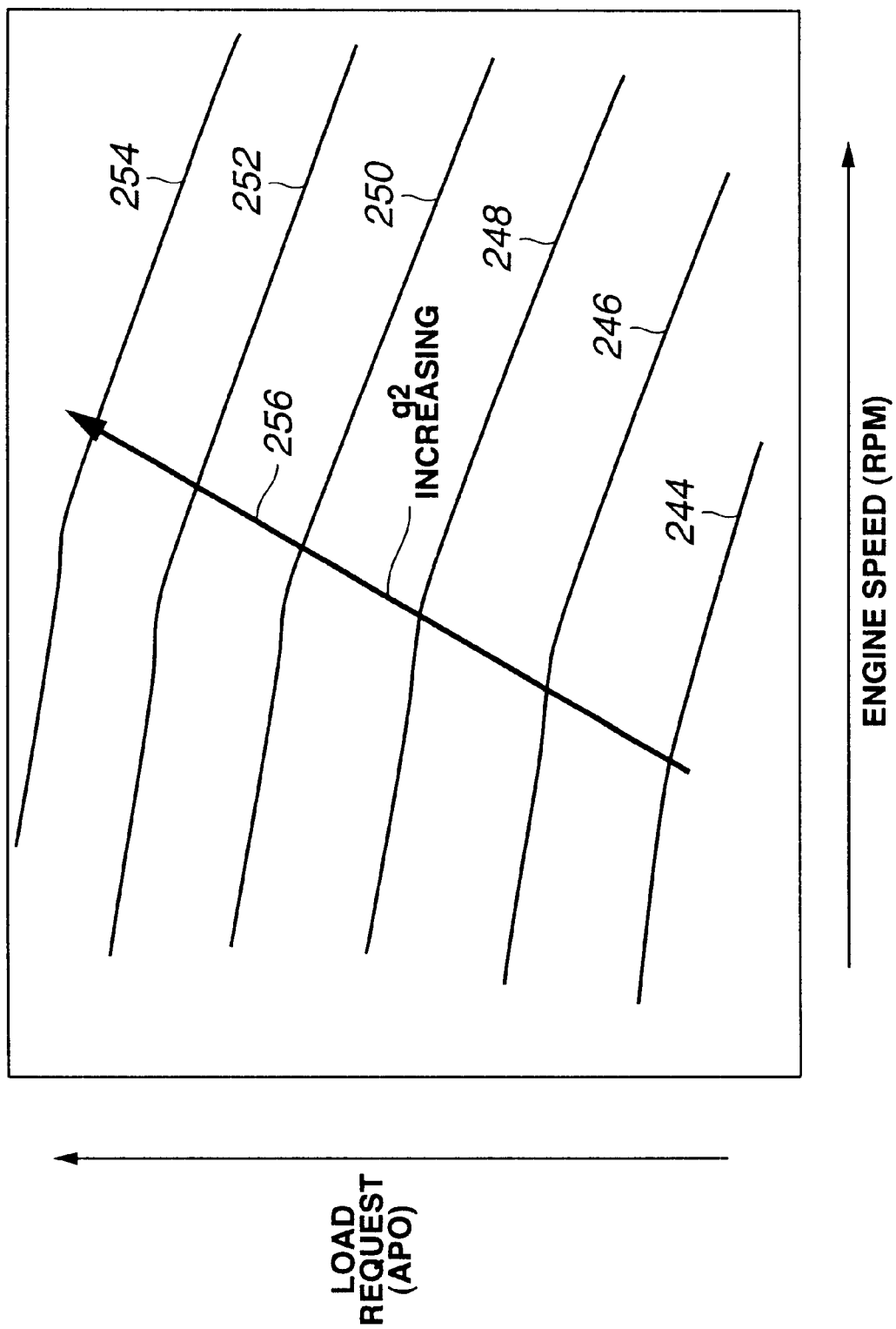
FIG. 22 is a graphical representation of variation of fuel quantity q2 for trigger injection against variation of engine speed and load request according to the third embodiment of the present invention.

FIG. 22 provides variation of fuel quantity q2 for trigger injection against variation of engine speed and load request. In FIG. 22, a plurality of lines 244, 246, 248, 250, 252, and 254 are illustrated, each line connecting equal value of fuel quantity q2 for trigger injection. The values on these lines increase as operation point shifts in a direction as indicated by an arrow 256. These values are stored in computer readable storage medium 66 in a map against various values of load request and engine speed. Thus appropriate values of fuel quantity q2 for trigger injection may be found in the map against various values of load request and engine speed. Fuel quantity q2 for trigger injection Increases as engine speed becomes high.

Figure 23:
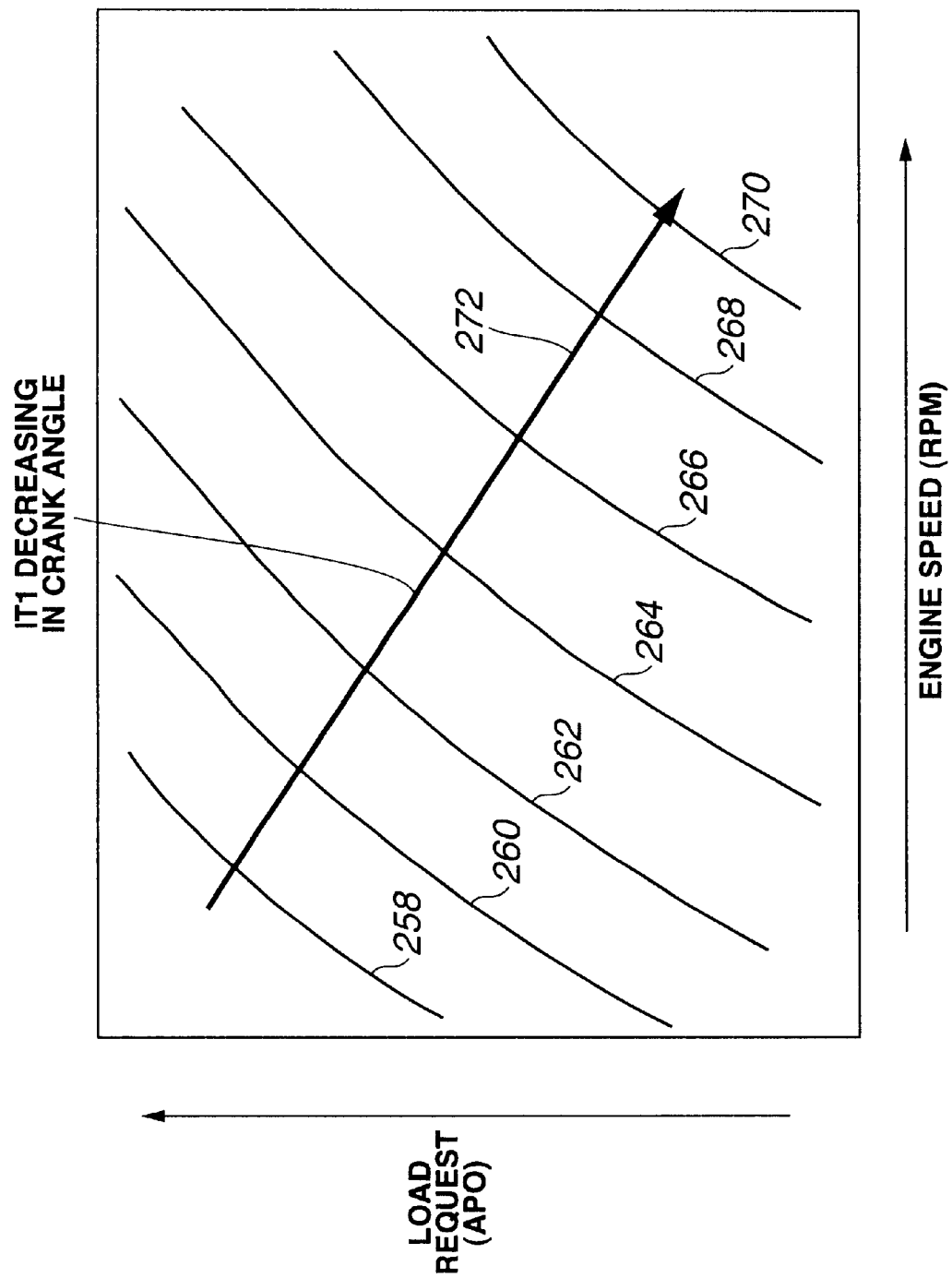
FIG. 23 is a graphical representation of variation of injection timing IT1 for main injection against variation of engine speed and load request according to the third embodiment of the present invention.

FIG. 23 provides variation of injection timing IT1 for main injection against variation of engine speed and load request. In FIG. 23, a number of lines 258, 260, 262, 264, 266, 268, and 270 are drawn, each line connecting equal crank angle for injection timing IT1 for main injection. The values on these lines decrease as operation point shifts in a direction as indicated by an arrow 272. These values are stored in computer readable storage medium 66 in a map against various values of load request and engine speed. Thus appropriate crank angle of injection timing IT1 for main injection may be found in the map against various values of load request and engine speed. Injection timing IT1 for main injection is advanced as engine speed becomes high.

FIG. 24 provides variation of injection timing IT2 for trigger injection against variation of engine speed and load request according to an alternative control strategy of the third embodiment of the present invention. In FIG. 24, a number of lines 274, 276, 278, 280, 282, and 284 are drawn, each line connecting equal crank angle for injection timing IT2 for trigger injection. The values on these lines decrease as operation point shifts in a direction as indicated by an arrow 286. These values are stored in computer readable storage medium 66 in a map against various values of load request and engine speed. Thus appropriate crank angle of injection timing IT2 for trigger injection may be found in the map against various values of load request and engine speed. Injection timing IT2 for trigger injection is advanced as engine speed becomes high. At higher speeds, it is necessary to retard BOB from BDC of induction stroke, and injection timing IT2 for trigger injection is advanced to cope with a considerable reduction in time at higher speeds.

A controller routine for operating the third embodiment is substantially the same as the controller routine illustrated in FIG. 13 except the manner of determining fuel quantities q1, and q2 in step 168, injection timing IT1 for main injection in step 170, and injection timing IT2 for trigger injection in step 172. In step 168, controller 14 performs a table look-up operation of map as illustrated in FIG. 21 against load request and engine speed to determine fuel quantity q1, and also performs a table look-up operation of map as illustrated in FIG. 22 against load request and engine speed to determine fuel quantity q2. In step 170, controller 14 performs a table look-up operation of map as illustrated in FIG. 23 against load request and engine speed to determine injection timing IT1 for main injection. In step 170, controller 14 performs a table look-up operation of map as illustrated in FIG. 18 or 24 against load request and engine speed to determine injection timing IT2 for trigger injection.

Referring to FIGS. 25 to 29, fourth embodiment according to the present invention is described.

The fourth embodiment is substantially the same as the first embodiment described before in connection with FIGS. 1 to 13. However, the fourth embodiment is different from the first embodiment in that cylinder temperature is controlled in response to operating conditions.

This fourth embodiment requires an exhaust gas temperature sensor 44, an EGR control valve 58 and an EGR conduit 56.

As mentioned before, in the embodiments, auto-ignition combustion is achieved at low and middle load, while spark-ignition combustion is accomplished at high speed with high load. Fuel with low cetane number, such as, gasoline, is difficult to ignite as compared to fuel with high cetane number, such as fuel for diesel engines. To achieve auto-ignition of gasoline fuel, it is useful to elevate temperature of mixture. In the fourth embodiment, exhaust gas from the EGR conduit is utilized to elevate the cylinder temperature.

Figure 25:
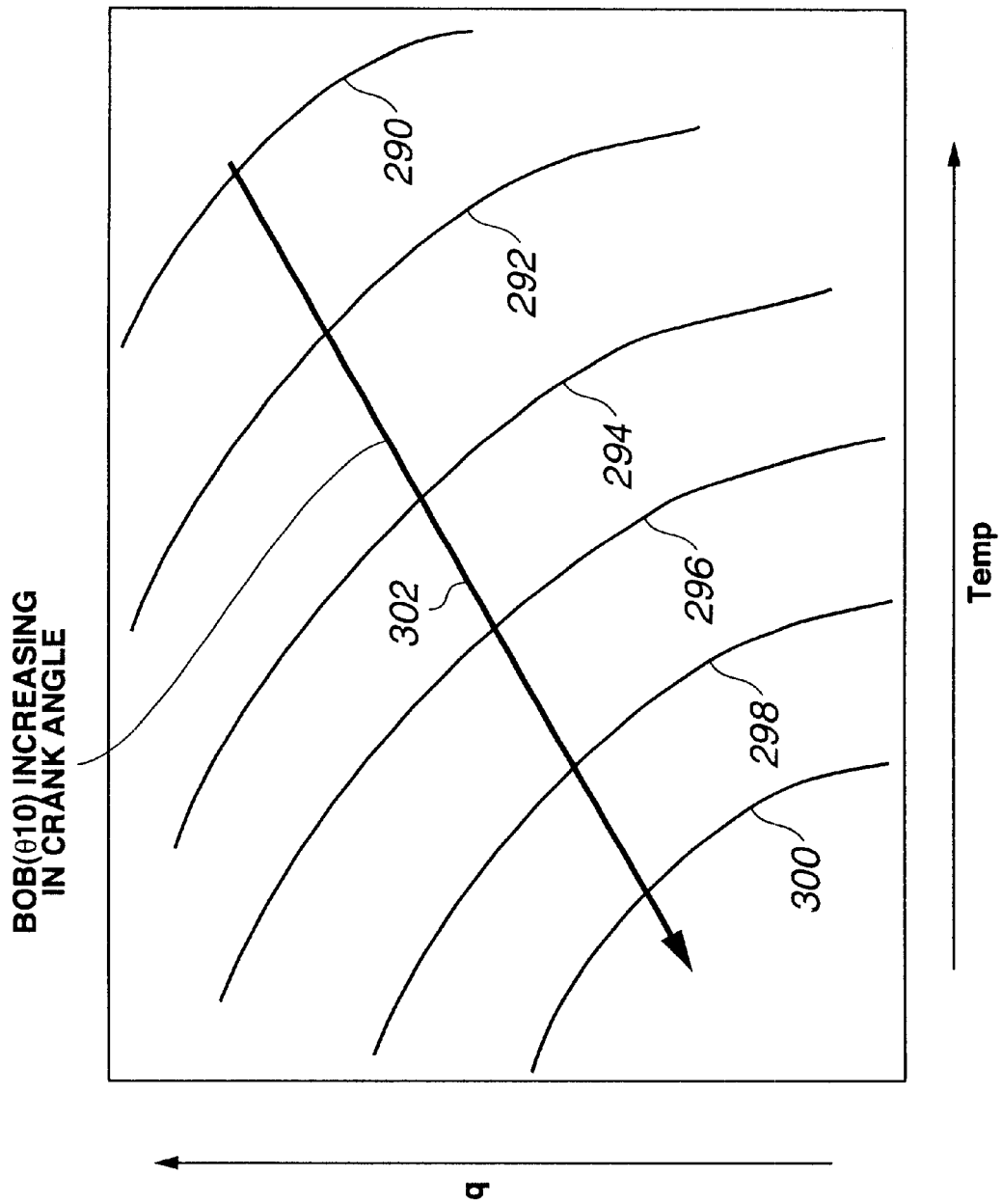
FIG. 25 is a graphical representation of variation of BOB against variation of total fuel quantity q and cylinder temperature Temp when air/fuel mixture is homogeneous.

FIG. 25 provides variation of BOB against variation of total fuel quantity q and cylinder temperature Temp when air/fuel mixture is homogeneous. In FIG. 25, a plurality of lines 290, 292, 294, 296, 298, and 300 are illustrated, each connecting equal crank angle for BOB against variation of fuel quantity q and cylinder temperature Temp. The crank angles on these lines increase as operation point shifts in a direction as indicated by an arrow 302. As cylinder temperature Temp becomes high, BOB is advanced. As cylinder temperature Temp becomes low, BOB is retarded. If fuel quantity q is increased, BOB is advanced. If, now, engine speed and load request are adjusted to certain values, BOB is determined for auto-ignition combustion while suppressing knock. If, with the same cylinder temperature Temp, fuel becomes easy to ignite as load request becomes high. Under this condition, mixture created by main injection becomes early to ignite to advance BOB from a target crank angle. In this case, rapid burning causes knock to occur.

Thus, it is necessary to lower cylinder temperature Temp when load request becomes high so as to prevent the mixture created by main injection from burning at earlier crank angle. In the fourth embodiment, supply of exhaust gas from EGR conduit 56 is regulated to lower cylinder temperature Temp when load request becomes high.

Figure 26:
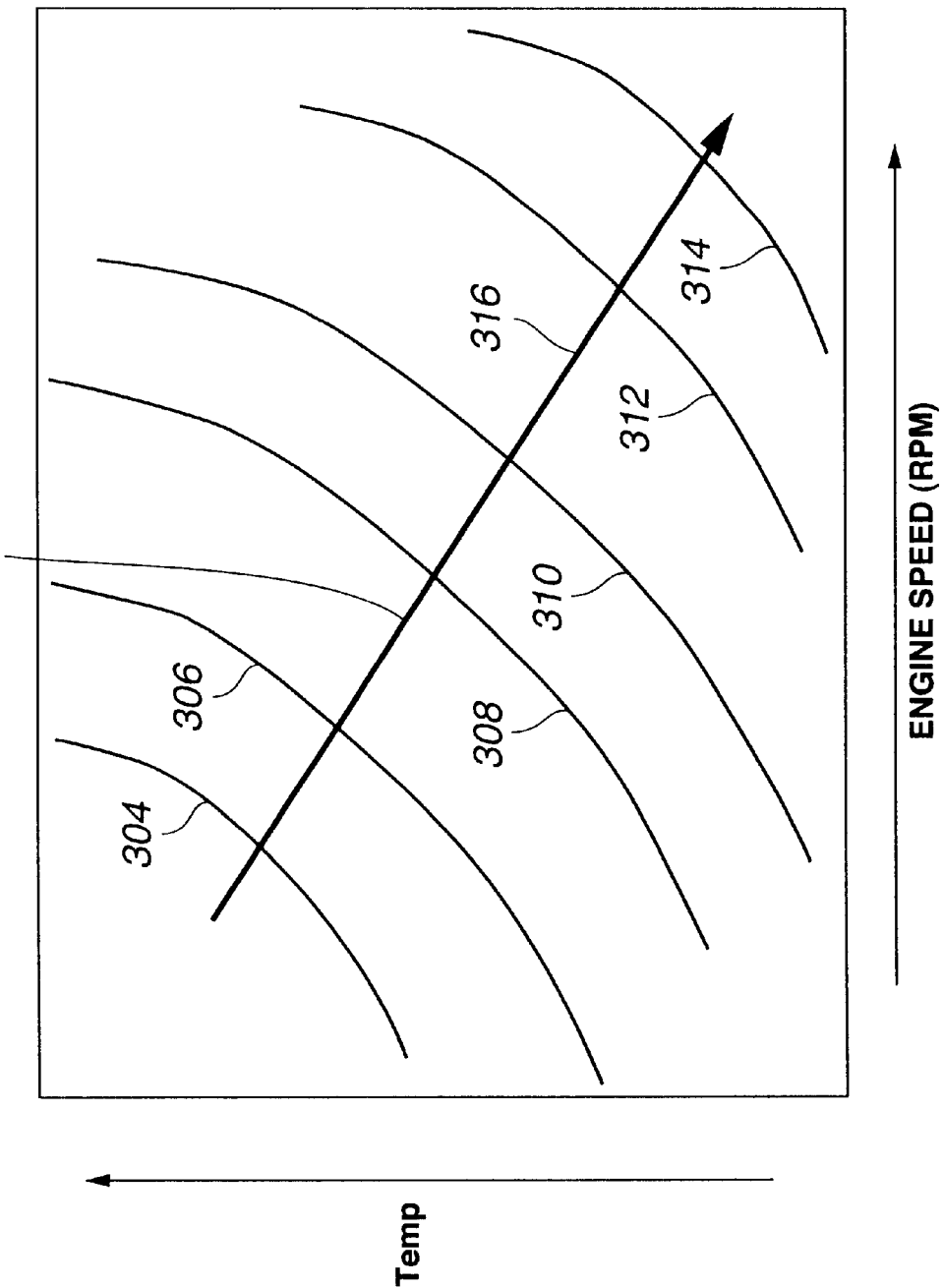
FIG. 26 is a graphical representation of variation of BOB against variation of engine speed and cylinder temperature Temp when air/fuel mixture is homogeneous.

FIG. 26 provides variation of BOB against variation of engine speed and cylinder temperature Temp when air/fuel mixture is homogeneous. In FIG. 26, a plurality of lines 304, 306, 308, 310, 312, and 314 are illustrated, each connecting equal crank angle for BOB against variation of engine speed and cylinder temperature Temp. The crank angles on these lines increase as operation point shifts in a direction as indicated by an arrow 316. At high engine speeds, period of time for reaction between fuel and oxygen is shortened, retarding BOB.

With the same cylinder temperature Temp, a target crank angle for BOB is retarded as engine speed becomes high. At high engine speeds, the period of time has been shortened. Under certain conditions, BOB may be retarded greatly from the target crank angle due to considerable influence by shortened period of time for reaction between fuel and oxygen. In this case, the cylinder temperature Temp is elevated to correct BOB in advance direction.

Figure 27:
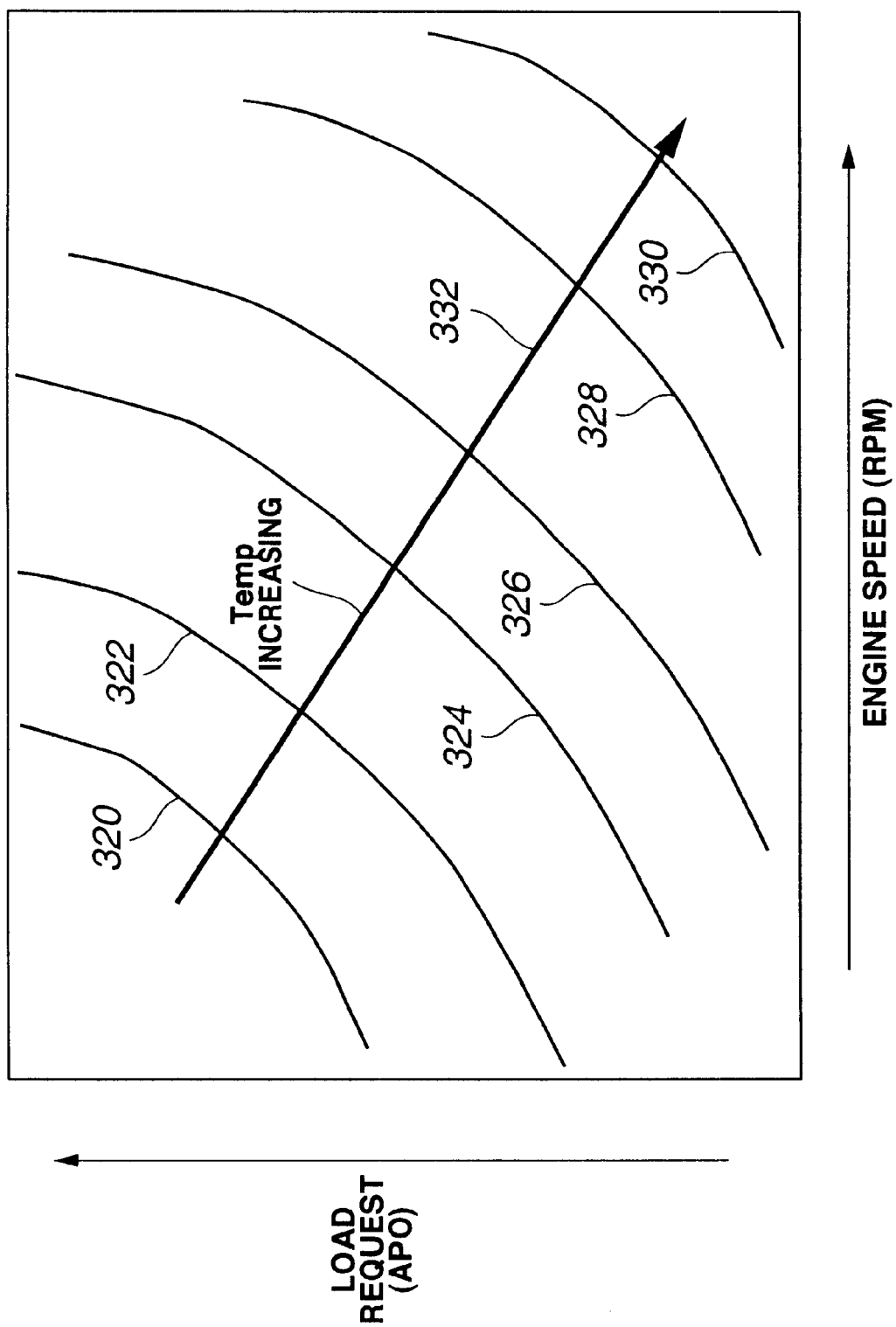
FIG. 27 is a graphical representation of variation of cylinder temperature Temp against variation of engine speed and load request according to fourth embodiment of the present invention.

FIG. 27 provides variation of target value of cylinder temperature Temp against variation of engine speed and load request. In FIG. 27, a plurality of lines 320, 322, 324, 326, 328, and 330 are illustrated, each connecting equal target value of cylinder temperature Temp against variation of engine speed and cylinder temperature Temp. The target values on these lines increase as operation point shifts in a direction as indicated by an arrow 332. Target value of cylinder temperature Temp increases as engine speed increases or load request becomes low, preventing the mixture created by main injection from burning or preventing deterioration of stability due to retard of BOB. These target values of cylinder temperature Temp are stored in computer readable storage medium 66 in a map against various values of load request and engine speed. Thus appropriate target value of cylinder temperature Temp may be found in the map against various values of load request and engine speed.

Figure 28:
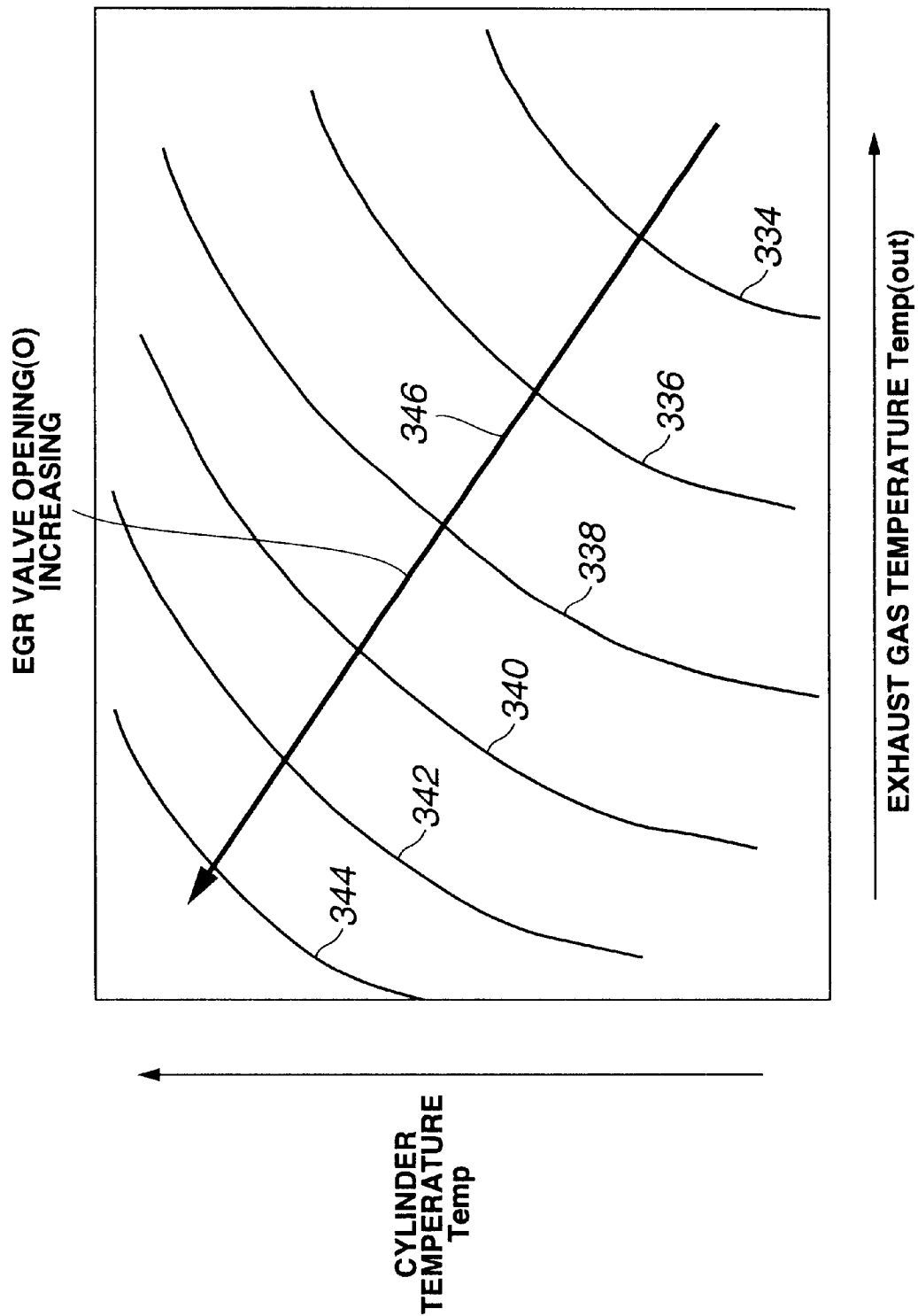
FIG. 28 is a graphical representation of variation of target value of an exhaust gas recirculation (EGR) valve opening against variation of exhaust gas temperature Temp(out) and cylinder temperature Temp according to the fourth embodiment of the present invention.

In the fourth embodiment, exhaust gas from EGR conduit 56 is used to control cylinder temperature Temp. FIG. 28 provides variation of target value of an exhaust gas recirculation (EGR) valve opening against variation of exhaust gas temperature Temp(out) and cylinder temperature Temp. In FIG. 28, a plurality of lines 334, 336, 338, 340, 342, and 344 are illustrated, each connecting equal target opening angle (0) of EGR valve 58 against variation of exhaust gas temperature Temp(out) and cylinder temperature Temp. The target opening angles on these lines increase as operation point shifts in a direction as indicated by an arrow 346. Exhaust gas temperature sensor 44 generates an output signal indicative of exhaust gas temperature Temp(out). Target opening angle (0) of EGR valve 58 increases as target value of cylinder temperature Temp(out) increases. Target opening angle (0) of EGR valve 58 increases as exhaust gas temperature Temp(out) drops. These target opening angles (0) of EGR valve 58 are stored in computer readable storage medium 66 in a map against various values of cylinder temperature Temp and exhaust gas temperature Temp(out). Thus appropriate target opening angle of EGR valve 58 may be found in the map against various values of cylinder temperature Temp and exhaust gas temperature Temp(out).

Figure 29:
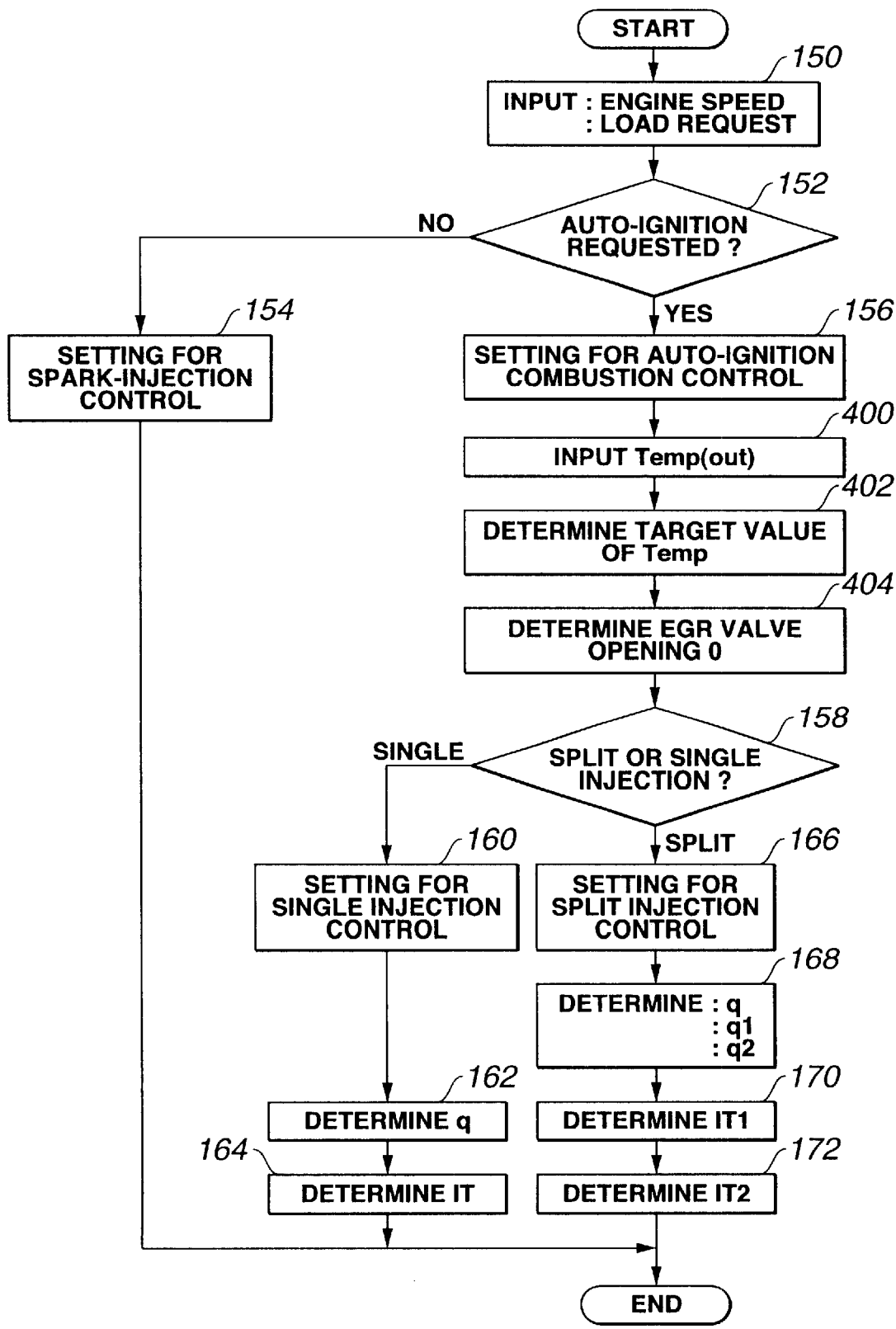
FIG. 29 is a flow chart of a controller routine for operating the fourth embodiment of the present invention.

FIG. 29 illustrates a controller routine for operating the fourth embodiment of the present invention. This routine is substantially the same as that illustrated in FIG. 13 except the provision of three steps 400, 402 and 404. These three steps 400, 402, and 404 are located between steps 156 and 158.

In step 400, controller 14 inputs exhaust gas temperature Temp(out). In step 402, controller 14 performs a table look-up operation of the map as illustrated in FIG. 27 against load request and engine speed to determine a target value of cylinder temperature Temp. In step 404, controller 14 performs a table look-up operation of the map as illustrated in FIG. 28 against cylinder temperature Temp and exhaust gas temperature Temp(out) to determine a target opening angle (o) of EGR valve 58.

Referring to FIGS. 30 to 34, fifth embodiment according to the present invention is described. This embodiment is substantially the same as the fourth embodiment except the use of so-called internal EGR instead of external EGR. In controlling the amount of exhaust gas retained, the exhaust gas retaining duration or minus overlap as shown in FIG. 31 is varied.

For further information on how to vary exhaust gas retaining duration, reference should be made to the commonly assigned pending U.S. Patent application Ser. No. unassigned yet, entitled "AUTO-IGNITION OF GASOILINE ENGINE BY VARYING EXHAUST GAS RETAINING DURATION", which claims priority of Japanese Patent Application No. 2000-095500 filed Mar. 30, 2000.

Figure 32:
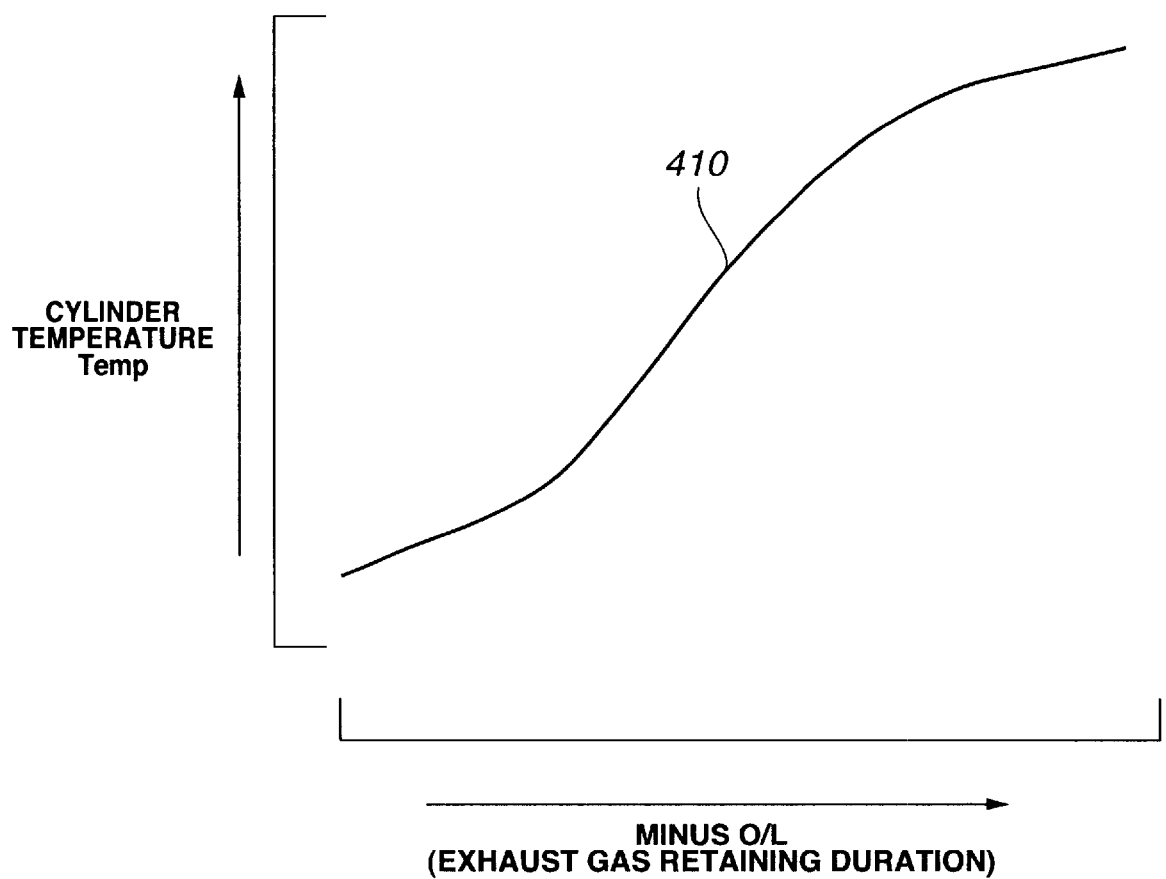
FIG. 32 is a graphical representation of variation of cylinder temperature Temp against variation of minus overlap (exhaust gas retaining duration) with exhaust gas temperature kept constant.

In FIG. 32, the illustrated curve 410 provides variation of cylinder temperature Temp against variation of minus overlap (exhaust gas retaining duration) with exhaust gas temperature kept constant. Cylinder temperature Temp rises as minus overlap (exhaust gas retaining duration) increases.

Figure 33:
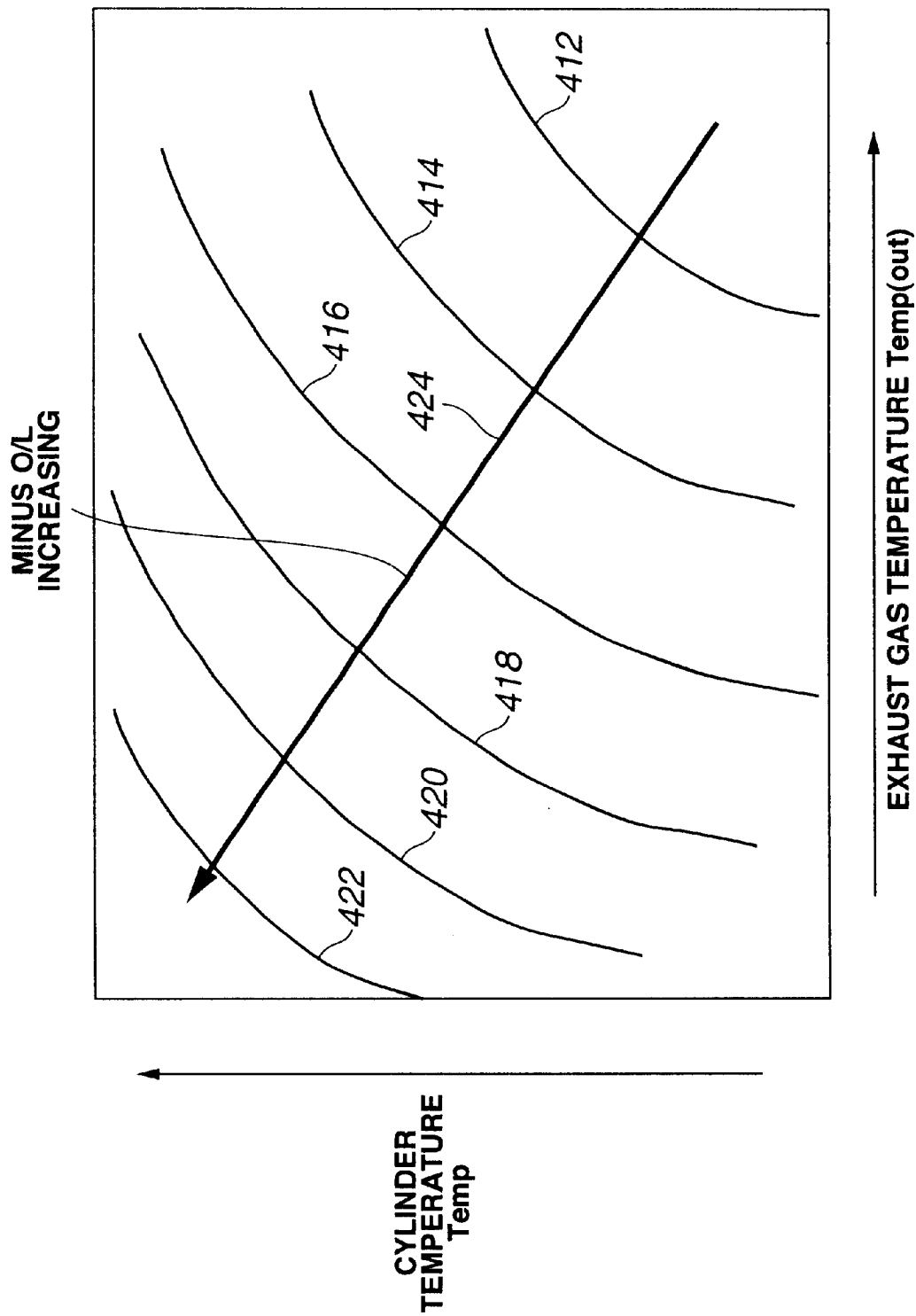
FIG. 33 is a graphical representation of variation of target value of minus overlap against variation of exhaust gas temperature Temp(out) and cylinder temperature Temp according to fifth embodiment of the present invention.

FIG. 33 provides variation of target value of minus overlap (exhaust gas retaining duration) against variation of exhaust gas temperature Temp(out) and cylinder temperature Temp. In FIG. 33, a plurality of lines 412, 414, 416, 418, 420, and 422 are illustrated, each connecting equal target value of minus overlap against variation of exhaust gas temperature Temp(out) and cylinder temperature Temp. The target values on these lines increase as operation point shifts in a direction as indicated by an arrow 424. These target values are stored in computer readable storage medium 66 in a map against various values of cylinder temperature Temp and exhaust gas temperature Temp(out). Thus appropriate target value of minus overlap may be found in the map against various values of cylinder temperature Temp and exhaust gas temperature Temp(out).

Figure 34:
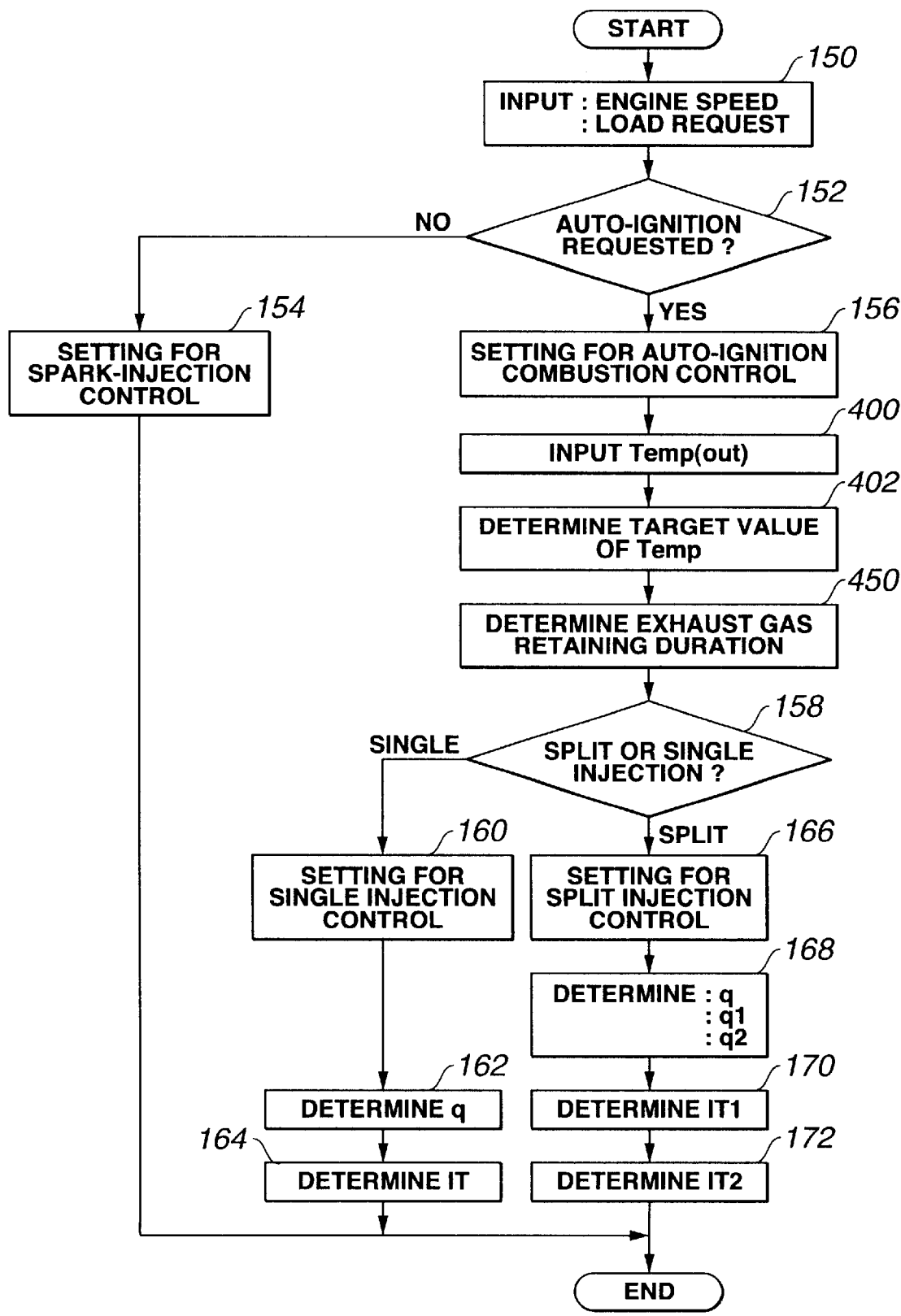
FIG. 34 is a flow chart of a controller routine for operating the fifth embodiment of the present invention.

FIG. 34 illustrates a controller routine for operating the fifth embodiment of the present invention. This routine is substantially the same as that illustrated in FIG. 29 except the provision of a new step 450 instead of step 404 of FIG. 29.

In step 450, controller 14 performs a table look-up operation of the map shown in FIG. 33 against cylinder temperature Temp and exhaust gas temperature Temp(out).

Figure 35:
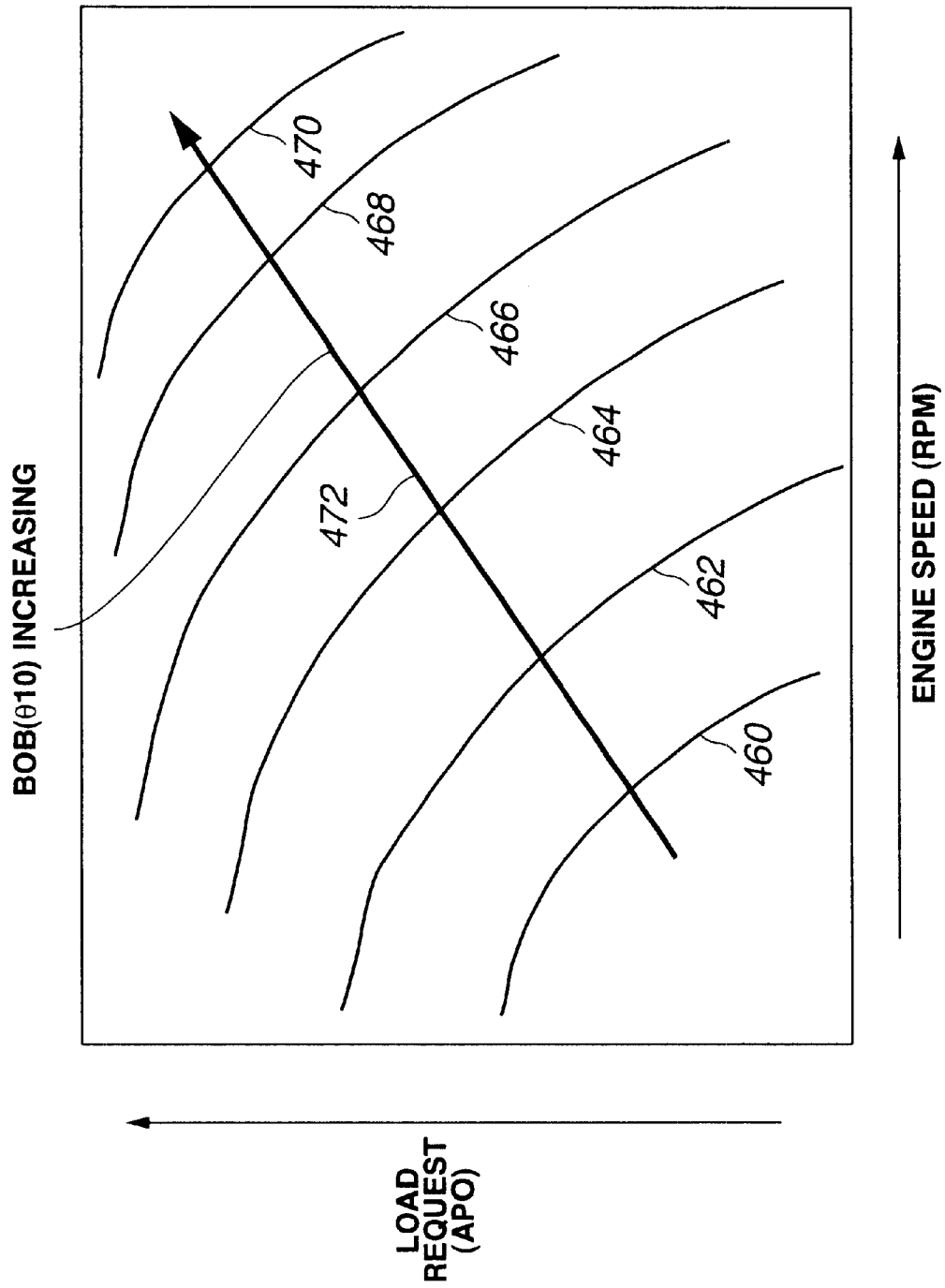
FIG. 35 is a graphical representation of variation of target value of BOB against variation of engine speed and load request according to sixth embodiment of the present invention.
Figure 36:
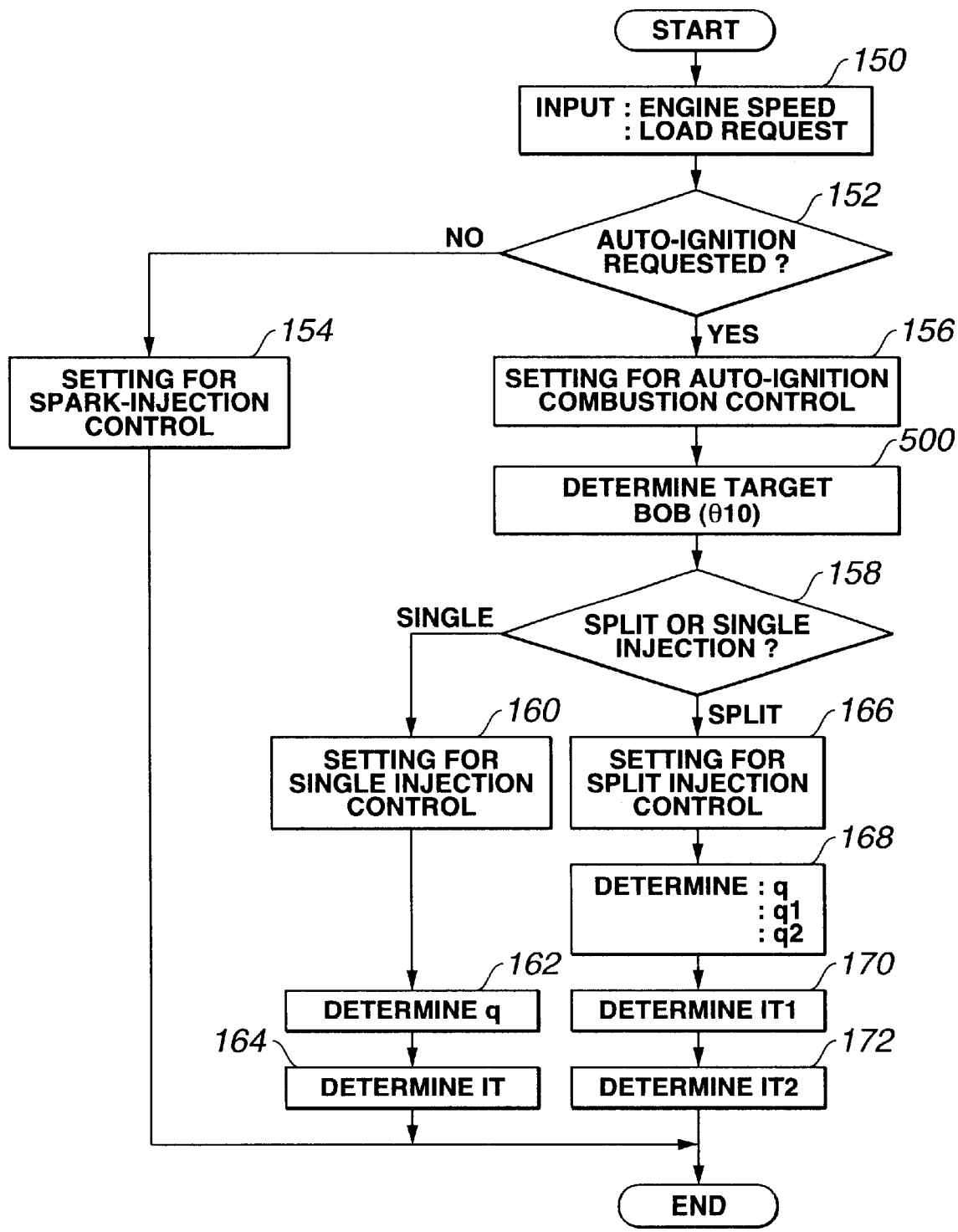
FIG. 36 is a flow chart of a controller routine for operating the sixth embodiment of the present invention.

Referring to FIGS. 35 and 36, sixth embodiment according to the present invention is described.

FIG. 35 provides variation of target value of BOB against variation of engine speed and load request. In FIG. 35, a plurality of lines 460, 462, 464, 466, 468, and 470 are illustrated, each connecting equal target value of BOB against variation of load request and engine speed. The target values on these lines increase as operation point shifts in a direction as indicated by an arrow 472. These target values are stored in computer readable storage medium 66 in a map against various values of load request and engine speed. Thus appropriate target value of BOB may be found in the map against various values of load request and engine speed.

FIG. 36 illustrates a controller routine for operating the sixth embodiment of the present invention. This routine is substantially the same as that illustrated in FIG. 13 except the provision of a new step 500 between steps 156 and 158 of FIG. 13.

In step 500, controller 14 performs a table look-up operation of the map shown in FIG. 35 against load request and engine speed to determine a target value of BOB. In steps 168, 170, and 172, fuel quantity and injection timing for each of main and trigger injections are found to accomplish auto-ignition combustion having BOB at the determined target value.

It is to be appreciated that the language "multiple injection" is meant to encompass an injection having a main injection and a trigger injection taking place in this order in one cycle or an injection having a main injection, a trigger injection and a third injection taking place in the order in one cycle.

Further, it is to be appreciated that the language "beginning of burning (BOB)" is herein used to mean time or crank angle at which 10% of the whole fuel has burned ($\theta 10$) or time or crank angle at which 20% of the whole fuel has burned ($\theta 20$) or time or crank angle at which 50% of the whole fuel has burned ($\theta 20$) or time or crank angle or time or crank angle at which cylinder pressure hits the maximum (Pmax) or time or crank angle at which the first time derivative dP/dt hits the maximum (dP/dtmax) or time or crank angle at which the frist time derivative dQ/dt hits the maximum (dQ/dtmax), or time or crank angle at which dQ/dθ hits the maximum (dP/dθmax).

While the present invention has been particularly described, in conjunction with preferred implementations and embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Applications No. 2000-190692, filed Jun. 26, 2000, the disclosure of which is hereby incorporated by reference in its entirety.

What is claimed is:

1. A system for enhancing engine operation on auto-ignition combustion, comprising:

at least one cylinder for receiving a piston to define a combustion chamber;

an engine controller;

a fuel injection system having a fuel injector for delivering fuel to the combustion chamber; and a computer readable storage medium having information stored thereon representing instructions executable by the engine controller to enhance engine operation on auto-ignition combustion, wherein the engine controller is capable of controlling the fuel injection system to perform a multiple injection wherein a main injection event and a trigger injection event take place in this order in one cycle, and wherein the computer readable storage medium includes instructions for operating the engine controller to:

determine operating conditions; and determine fuel quantity and injection timing for at least one of main and trigger injections corresponding to the operating conditions to enable the multiple injection to govern beginning of burning (BOB).

2. An internal combustion engine comprising:

at least one cylinder for receiving a piston to define a combustion chamber;

an engine controller;

a fuel injection system having a fuel injector for delivering fuel to the combustion chamber; and a computer readable storage medium having information stored thereon representing instructions executable by the engine controller to enhance engine operation on auto-ignition combustion, wherein the engine controller is capable of controlling the fuel injection system to perform a multiple injection wherein a main injection event and a trigger injection event take place in this order in one cycle, and wherein the computer readable storage medium includes instructions for operating the engine controller to:

determine operating conditions; and determine fuel quantity and injection timing for at least one of main and trigger injections corresponding to the operating conditions to enable the multiple injection to govern beginning of burning (BOB).

3. An internal combustion engine as claimed in claim 2, wherein the multiple injection includes an injection event after trigger injection event.

4. An internal combustion engine as claimed in claim 2, wherein the trigger injection event takes place nearer to top dead center of compression stroke of the piston than the main injection event.

5. An internal combustion engine as claimed in claim 4, wherein the computer readable storage medium has instructions for operating the engine controller to determine fuel quantity for each of main and trigger injections and timing for each of main and trigger injections corresponding to the operating conditions including load request and engine speed.

6. An internal combustion engine as claimed in claim 5, wherein the computer readable storage medium has instructions for operating the engine controller to retard injection timing for the trigger injection as the load request becomes high.

7. An internal combustion engine as claimed in claim 5, wherein the computer readable storage medium has instructions for operating the engine controller to retard injection timing for the trigger injection as the engine speed becomes high.

8. An internal combustion engine as claimed in claim 4, wherein the computer readable storage medium has instructions for operating the engine controller to increase fuel quantity for each of the main and trigger injections as the load request becomes high.

9. An internal combustion engine as claimed in claim 4, wherein the computer readable storage medium has instructions for operating the engine controller to vary a ratio of fuel quantity for the main injection to total of fuel quantities for the main and trigger injections in response to the engine speed such that fuel quantity for the trigger injection increases as the engine speed becomes high.

10. An internal combustion engine as claimed in claim 2, wherein the fuel has low cetane number.

11. An internal combustion engine as claimed in claim 2, wherein the computer readable storage medium has instructions for operating the engine controller to determine a target crank angle at which beginning of burning (BOB) is to take place, the target crank angle is retarded as load request increases; and determine fuel quantity for each of main and trigger injections and injection timing for each of main and trigger injections to cause the BOB to take place at the target crank angle.

12. An internal combustion engine as claimed in claim 11, wherein the target crank angle at which the BOB is to take place is retarded as engine speed increases.

13. An internal combustion engine as claimed in claim 2, wherein the computer readable storage medium has instructions for operating the engine controller to lower cylinder temperature as load request increases.

14. An internal combustion engine as claimed in claim 13, wherein the computer readable storage medium has instructions for operating the engine controller to elevate cylinder temperature as engine speed increases.

15. An internal combustion engine as claimed in claim 13, further comprising an external exhaust gas recirculation (EGR) system for admitting to the combustion chamber a controlled amount of exhaust gas discharged from the combustion chamber, and wherein the computer readable storage medium has instructions for operating the engine controller to operate the external EGR system to vary the controlled amount of exhaust gas to vary cylinder temperature.

16. An internal combustion engine as claimed in claim 12, further comprising an inlet control device for controlling flow into the combustion chamber, and an outlet control device for controlling flow out of the combustion chamber, and wherein the computer readable storage medium has instructions for operating the engine controller to operate the inlet and outlet control devices to vary exhaust gas retaining duration to vary cylinder temperature.

17. A computer readable storage medium having stored therein data representing instructions executable by an engine controller to control a fuel injection system capable of performing a multiple injection wherein a main injection event and a trigger injection event take place in this order in one cycle, the computer readable storage medium comprising:

instructions for determining load request instructions for determining engine speed;

instructions for determining whether or not the load request and the engine speed fall in an auto-ignition combustion range;

instructions for establishing a load request threshold;

instructions for comparing the load request to the load request threshold; and instructions for disabling the multiple injection when the load request falls below the load request threshold under condition when it is determined that the load request and the engine speed fall in the auto-ignition combustion range, otherwise, enabling split injection to enhance engine operation on auto-ignition combustion under condition when it is determined that the load request and the engine speed fall in the auto-ignition combustion range.

18. A method of controlling a fuel injection system capable of performing a split injection wherein a main injection event and a trigger injection event take place in this order in one cycle, comprising:

establishing a target crank angle at which beginning of burning (BOB) is to take place;

determining operating conditions; and determining fuel quantity and injection timing for at least one of main and trigger injections corresponding to the operating conditions to enable the multiple injection to achieve auto-ignition combustion with the BOB taking place at the target crank angle.

* * * * *